(12) United States Patent
Srinivasa et al.

(10) Patent No.: US 8,296,850 B2
(45) Date of Patent: Oct. 23, 2012

(54) DETECTING GLOBAL ANOMALIES

(75) Inventors: Srinath Srinivasa, Bangalore (IN); Pramod Sakharam Pawar, Bangalore (IN)

(73) Assignee: Empire Technology Development LLC, Wilmington, DE (US)

( * ) Notice: Subject to any disclaimer, the term of this patent is extended or adjusted under 35 U.S.C. 154(b) by 872 days.

(21) Appl. No.: 12/195,786

(22) Filed: Aug. 21, 2008

(65) Prior Publication Data

US 2009/0300769 A1 Dec. 3, 2009

(30) Foreign Application Priority Data

May 28, 2008 (IN) ............................ 1304/DEL/2008

(51) Int. Cl.
*H04L 9/32* (2006.01)
(52) U.S. Cl. .................. 726/26; 726/2; 726/22; 726/23; 726/24; 726/25; 709/223; 709/224; 709/225
(58) Field of Classification Search .......... 726/2, 22–26; 709/223–225
See application file for complete search history.

(56) References Cited

U.S. PATENT DOCUMENTS

| | | | |
|---|---|---|---|
| 7,594,260 B2 * | 9/2009 | Porras et al. | 726/13 |
| 2005/0222929 A1 * | 10/2005 | Steier et al. | 705/35 |
| 2007/0150954 A1 * | 6/2007 | Shon | 726/23 |
| 2008/0250497 A1 * | 10/2008 | Mullarkey et al. | 726/22 |
| 2008/0288427 A1 * | 11/2008 | Barson et al. | 706/25 |
| 2009/0161544 A1 * | 6/2009 | Kelly et al. | 370/232 |
| 2009/0172818 A1 * | 7/2009 | Sutherland et al. | 726/25 |
| 2010/0118881 A1 * | 5/2010 | Palmer et al. | 370/401 |

OTHER PUBLICATIONS

Dash et al., When Gossip Is Good: Distributed Probabilistic Inference for Detection of Slow Network Intrusions, In Proceedings of the 21st National Conference on Artificial Intelligence, 2006, pp. 1115-1122.
Li et al., Dependency-based Distributed Intrusion Detection, In Proceedings of the DETER Community Workshop on Cyber Security Experimentation and Test 2007, pp. 1-8.
Huang et al., Distributed PCA and Network Anomaly Detection, Technical Report No. UCB/EECS-2006-99, Electrical Engineering and Computer Science Department, University of California Berkeley, Jul. 14, 2006, pp. 1-15.
Choon, O. and Samsudin, A., "Grid-based intrusion detection system" in Proc 9th Asia-Pacific Conference on Communications, vol. 3, pp. 1028-1032, Sep. 21-24, 2003.
Denning, D. E., "An intrusion-detection model." IEEE Transactions on Software Engineering, vol. SE-13(No. 2):222-232, Feb. 1987.
K. Kendall, "A Database of Computer Attacks for the Evaluation of Intrusion Detection Systems", Master Thesis, Department of Electrical Engineering and Computer Science, Massachusetts Institute of Technology (MIT), Cambridge, MA, USA, Jun. 1999.
Kenny, S. and Coghlan, B., "Towards a grid-wide intrusion detection system", in Proc. European Grid Conference (EGC2005), pp. 275-284, Amsterdam, The Netherlands, Feb. 2005.

(Continued)

*Primary Examiner* — Aravind Moorthy
*Assistant Examiner* — Joseph Pan
(74) *Attorney, Agent, or Firm* — Knobbe, Martens, Olson & Bear, LLP

(57) ABSTRACT

Systems and methods of detecting distributed attacks that pose a threat affecting more than one node in the network. The distributed attacks include events that appear normal or innocuous when viewed locally at any node. The systems and methods include reference global profiles and detection global profiles corresponding to activities or events of interest on the network.

57 Claims, 9 Drawing Sheets

OTHER PUBLICATIONS

"Model for Global Anomaly Detection," presentation by Pramod Pawar at the Indian Institute of Technology Madras, India on Dec. 29, 2007.

"N@G—Network at Guard, A hybrid Intrusion Detection System," available at http://www.ncb.ernet.in/nag/, last updated on Aug. 9, 2004.

"Intrusion Detection FAQ," available at http://www.sans.org/resources/idfaq/, last updated Feb. 18, 2008.

http://www.snort.org/, archived copy from May 18, 2008.

Tolba, M. F. ; et al. GIDA: Toward Enabling Grid Intrusion Detection Systems. 5th IEEE International Symposium on Cluster Computing and the Grid, May 2005.

* cited by examiner

|  | $t_1$ | $t_2$ | $t_3$ | ... | $t_m$ |
|---|---|---|---|---|---|
|  |  |  |  | ... |  |
| $e_1$ | $P_{11}$ | $P_{12}$ |  |  |  |
| $e_2$ | $P_{21}$ |  |  |  |  |
| $e_3$ |  |  |  |  |  |
|  |  |  |  |  |  |
|  |  |  |  |  |  |
| $e_N$ |  |  |  |  |  |

Fig. 1

|  | $t_1$ | $t_2$ | $t_3$ | .... | $t_{24}$ |
|---|---|---|---|---|---|
| $U_1$ | $p_{11}$ | $p_{12}$ | ... |  |  |
| $U_2$ |  |  |  |  |  |
| $U_3$ |  |  |  |  |  |
| .... |  |  |  |  |  |
| $U_N$ |  |  |  |  |  |

Fig. 6

DETECTING GLOBAL ANOMALIES

CROSS-REFERENCE TO RELATED APPLICATIONS

This application claims the benefit of priority to India Application No. 1304/DEL/2008, filed May 28, 2008.

BACKGROUND

A network as simple as two computers linked with a crossover cable has several points at which the network could fail. Large networks can have many points or nodes at which a single failure could disable the network.

The general rule for networks is that they should have no single point of failure. The broad factors that can bring down networks are:
Attacks: these include software attacks by various miscreants (e.g., malicious hackers, computer criminals) as well as physical destruction of facilities.
Failures: these are in no way deliberate, but range from human error in entering commands, bugs in network element executable code, failures of electronic components, and other things that involve deliberate human action or system design.
Accidents: Ranging from spilling coffee into a network element to a natural disaster or war that destroys a data center, these are largely unpredictable events. Survivability from severe accidents will require physically diverse, redundant facilities. Among the extreme protections against both accidents and attacks are airborne command posts and communications relays, which either are continuously in the air, or take off on warning. In like manner, systems of communications satellites may have standby spares in space, which can be activated and brought into the constellation.

Computer networks, large data grids, and information systems are becoming increasingly common place in several application areas such as banking, insurance, supply-chains, travel, enterprise intranets, etc. As the size of the network grows, it typically becomes more vulnerable to newer kinds of security threats that were hitherto implausible. One such vulnerability is due to distributed attacks. Distributed security threats are receiving increasing research interest due to the ubiquity of this problem. Some kinds of distributed attacks such as DDoS (Distributed Denial of Service) have been studied. They pose a class of attacks where global anomaly detection is triggered by exchanging information between nodes that have detected some local anomaly.

There is, however, another class of distributed attacks that pose a global threat, that is, a threat affecting more than one node in the network. This second class of distributed attacks includes events that appear normal or innocuous when viewed locally at any node. Absent global information, such threats are difficult or impossible to detect. However, because the events appear innocuous at every local node, there is little reason for the individual nodes to suspect anything wrong and exchange information.

BRIEF DESCRIPTION OF THE DRAWINGS

FIG. 1 is a matrix of probabilities of observed events according to an embodiment.

FIG. 6 is probability distribution of an illustrative example according to an embodiment.

DETAILED DESCRIPTION

Figure 2:
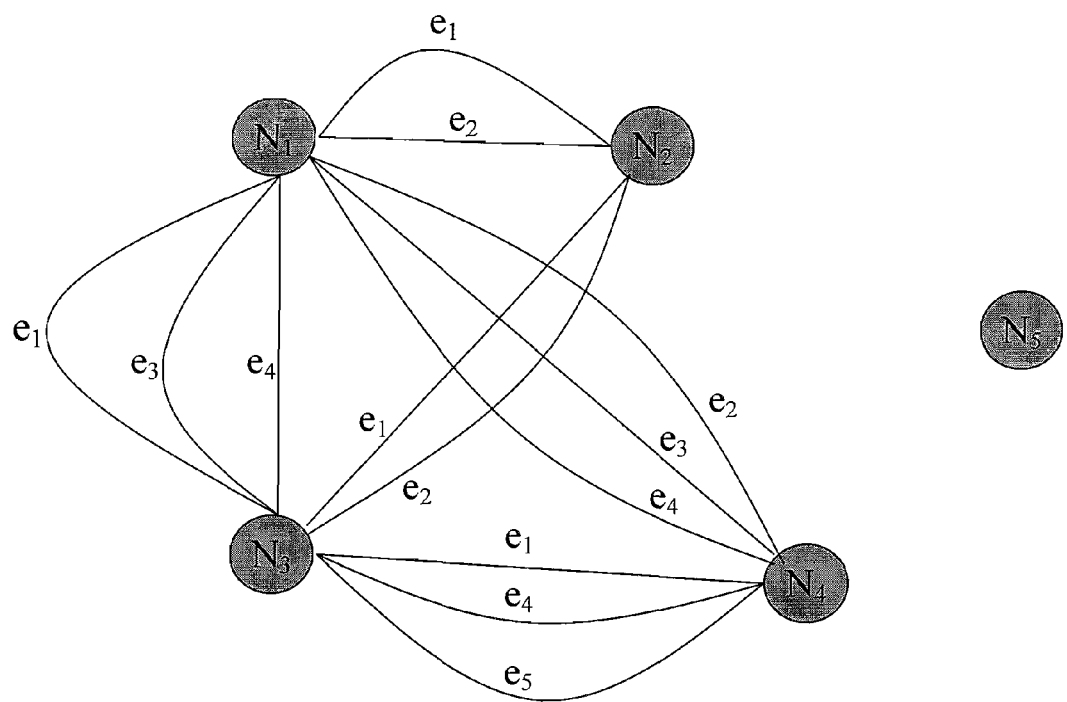
FIG. 2 is an event correlation graph according to an embodiment.

As used in the specification and claims, the singular forms "a", "an" and "the" include plural references unless the context clearly dictates otherwise. For example, the term "a reference local profile" may include a plurality of local profiles unless the context clearly dictates otherwise.

The disclosed embodiments may be used with and include computer networks of all sizes. A network may be described as collection of interconnected nodes in which each node includes a computer on the network. The networks of the embodiments may be defined according to the scale: Personal area network (PAN), Local Area Network (LAN), Campus Area Network (CAN), Metropolitan area network (MAN), or Wide area network (WAN). Ethernet (physical wiring to connect devices) could be the interface to the networks of the embodiments. The networks of the embodiments can also be defined according to the hardware technology that is used to connect the individual devices in the network such as Optical fiber, Ethernet, Wireless LAN, HomePNA, or Power line communication. Wireless LAN technology could be built to connect devices without wiring, optionally using a radio frequency to connect. The network of the embodiments could employ the use of hubs, switches, bridges, and routers. The networks of various embodiments may have the functional relationships which exist between the elements of the network, e.g., Active Networking, Client-server and peer-to-peer (workgroup) architectures. The networks of the embodiments may have different network topology upon which the network is based, such as Bus network, Star network, Ring network, Mesh network, Star-bus network, Tree or Hierarchical topology network, etc. Network Topology signifies the way in which intelligent devices in the network see their logical relations to one another. The use of the term "logical" is that the network topology is independent of the "physical" layout of the network. Even if networked computers are physically placed in a linear arrangement, if they are connected via a hub, the network has a Star topology, rather than a Bus Topology. In this regard the visual and operational characteristics of a network are distinct; the logical network topology is not necessarily the same as the physical layout.

An event class is any type of activity that takes place on one or more nodes that is of interest. A user login, for example, may be an event class. Other event classes include, but are not limited to, unauthorized access, exploits being attempted, attacks being launched, and other abnormal behaviors. Exploits typically are a piece of software or sequence of commands that take advantage of bugs or vulnerabilities in order to cause unintended or unanticipated behavior to occur on the computer system. One example of an exploit that has been attempted is trying for privilege escalation. Privilege escalation is the act taking advantage of the bugs in a software application to gain access of resource which normally would have been protected. The result of privilege escalation is that the application performs actions with more privileges than intended by the applications or the user. An example attack is a denial of service attack (DoS attack or Distributed Denial of Server (DDOS attack). The denial of service attack is a well known example of computer system attack in which attempts are made to make a computer resource unavailable to its intended legitimate users. Abnormal behavior refers to something that deviates from the expected normal behavior. A system is usually optimized towards its normal behavioral profile. Deviations from this profile may cause unnecessary burden on the system resources—sometimes serious enough to hamper its normal activities.

An event instance is a specific occurrence of an event of a given class. An event signature, or local profile, is the probability of the occurrence of an event instance as a function of time over a predetermined time period called an "epoch." This probability may be conveniently represented by use of a histogram or any other statistical function such as a probability distribution that describes the values and probabilities that a random event instance can take place. As networks get larger and event instances increase, a probability distribution rather than a histogram may be used. Generally, a local profile is specific to an event class and a node.

An epoch is a period of time, for example a day or a week, over which an event's local profile is recorded. An epoch is an arbitrary unit of time which typically has some relevance to the event class to be profiled. For example, if the event class is a user login, a suitable epoch may be one day. The epoch, in turn, is typically divided into suitable time units, such as an hour. Thus, for the login example the epoch may be divided into 24 one hour units.

A clique is a group of nodes, typically a small portion of the network, which has a feature or event class in common. The clique may be conveniently illustrated as a graph of interconnected nodes. A maximal clique is a graph structure in which every node is (logically) connected to every other node of the clique. A global profile or global event signature of an event may comprise a set of cliques or maximal cliques in which there is a high pair-wise correlation between the local profiles of any given pair of nodes in the clique.

A graph in the embodiments refers to a collection of vertices or nodes and a collection of edges that connect pairs of vertices. A graph may be undirected, meaning that there is no distinction between the two vertices associated with each edge, or its edges may be directed from one vertex to another.

Several embodiments may be conveniently described as including two phases. Other embodiments may have more phases. The first phase is generally referred to as a profiling phase, while the second phase is generally referred to as a detection phase. In the profiling phase, a set of desired event classes are selected and event instances are observed for a predetermined number of epochs. The observed data may then used to build local profiles on the various nodes of the network. As described in more detail below, the local profiles may then used to build global profiles of the selected event classes. The global profiles of an event class generated in the profiling phase display the "normal" behavior of the event class. The global profiles generated in the profiling phase may conveniently be referred to as the reference global profile. To reveal anomalies, the reference global profiles are compared to global profiles generated in the detection phase (detection global profiles).

Typically, building global profiles is a resource intensive process in terms of communications and cost. Therefore, the profiling phase in many embodiments is a relatively infrequent activity.

In the detection phase, event instances for which reference global profiles have been generated are available are observed. Detection local profiles are generated from event instances observed in the detection phase. In many embodiments, the detection local profiles are exchanged with the nodes of the relevant reference global profile. Typically, the number of nodes in the reference global profile is smaller than the entire network. Thus, the detection phase typically involves fewer communications than the profiling phase. Upon the exchange of the detection local profiles, detection global profiles corresponding to the reference global profiles can be generated. Anomalies can then be detected by comparing the detection global profiles to the reference global profiles.

One embodiment is a method that includes the steps of: (1) building a reference global profile of a first event class, (2) building a detection global profile of the first event class, and (3) determining if there is a deviation between the reference global profile and the detection global profile. In other embodiments, however, the method may include fewer or more steps, the steps may be performed in different orders, or the steps may be broken into substeps or combined into fewer steps. In this embodiment, building the reference global profile includes a step of generating a local profile of the first event class. In this embodiment, generating the local profile typically includes selecting an epoch, dividing the epoch into time segments, and recording a reference event of the first event class occurring on a first node during the epoch. The reference event is an occurrence of an event of the first event class observed during the reference or profiling phase of the method.

Typically, the reference events in the local profile are stored in conjunction with the appropriate time segment of the epoch. Thus, in one aspect, the local profile may be represented as a histogram. In anther aspect, the local profile may be expressed as a function rather than a histogram. This aspect may be more appropriate for large networks with large amounts of data. In one embodiment, the local profile is generated during one epoch. However, the local profile may be generated using a multitude of epochs.

Generally, the method includes recording reference events of the first event class and generating reference local profiles of the first event class for other nodes on the network in addition to the first node on the network. In this manner, a multitude of local profiles can be generated. Once the various local profiles are generated, they are exchanged among the first node and the other nodes on the network.

In an alternative embodiment, the various local profiles are not exchanged with the other nodes on the network. In this embodiment, a hash function is computed for the first event class which converts the first event class into a node address. A hash function is any well-defined procedure or mathematical function for turning some kind of data into a relatively small integer that may serve as an index into an array. The values returned by a hash function are called hash values, hash codes, hash sums, or simply hashes. In this embodiment, the first local profile is sent to the node with the address returned by the hash function. In embodiments with more than one event class, the hash function returns a unique node address for each event class. In this manner, all the event profile information may be sent to a small number of nodes (equal to the number of event classes) rather than sending all of the profiles associated with an event class to all of the nodes.

In one embodiment, the method includes a step of computing pair-wise correlation scores between the various local profiles to produce pairs of correlated local profiles. In one aspect, the pair-wise correlation scores are calculated with a Pearson correlation coefficient. In statistics, the Pearson product-moment correlation coefficient (sometimes referred to as the MCV or PMCC) (r) is a common measure of the correlation between two variables X and Y. Pearson's correlation reflects the degree of linear relationship between two variables. It ranges from +1 to −1. A correlation of +1 means that there is a perfect positive linear relationship between variables. A correlation of −1 means that there is a perfect negative linear relationship between variables. A correlation of 0 means there is no linear relationship between the two variables. The statistic is defined as the sum of the products of the standard scores of the two measures divided by the degrees of freedom:

$$r = \frac{\sum z_x z_y}{n-1}$$

Other metrics for computing correlation or similarity between local event profiles can also be used. Some examples include Chi Square tests between pairs of local profiles and testing for mutual information between local profiles.

In one, the method includes a step of generating a graph structure of the pairs of correlated local profiles of the first event class. The graph structure represents a reference global profile of the first event class. That is, it illustrates the nodes and the connections between the nodes in which events of the first event class were observed. In one aspect of this embodiment, the method includes a step of splitting the graph structure into a multitude of cliques. In another aspect, the cliques are maximal.

In some embodiments, the method includes a step of calculating an energy (E) of the cliques. This embodiment may include the step of storing a set of nodes that comprise the multitude of cliques and the energy of the cliques. Typically, the set of nodes is a subset of the network and includes the first node and some of the other nodes on the network. The energy (E) may be calculated by any number of suitable equations that provide a measure of the total level of correlation in a clique. In one aspect, the energy is calculated from the following equation:

$$E = \frac{\mu}{1+\sigma^2}$$

In this equation, $\mu$ is a mean of the absolute value of the correlation scores of the pair-wise correlated local profiles of the cliques and $\sigma^2$ is the variance.

In one embodiment, the set of nodes that comprise the multitude of cliques and the energy of the cliques are stored on one or more nodes which comprise the reference global profile of the first event class. Typically, the set of nodes that comprise the multitude of cliques and the energy of the cliques are stored on all of the nodes which comprise the reference global profile. In some embodiments, the reference global profile includes local profiles from substantially all of the nodes on the network.

In one embodiment, building a detection global profile of the first event class includes detecting a detection event of the first event class after the building of the reference global profile of the first event class. The detection event is an occurrence of an event of the first event class observed during the detection phase of the method. In some embodiments, the building of the detection global profile starts as soon as reference global profile for the first event class has been built. In some embodiments, the building of the detection global profile is done using a sliding window. A sliding window is a moving time frame in which new data is added as the window advances in time and old data drops off. The sliding window may include the same number of epochs as used to generate the local profile as used to build the reference global profile. However, in other embodiments, the sliding window includes a different number of epochs as used to determine the reference global profile.

Typically, the detection global profile is built by constructing detection local profiles of the detected events of the first class. The method of this embodiment may also include the step of exchanging the detection local profiles of the detected events of the first class from the first node and the other nodes in the reference global profile. The method may also include calculating a detection global profile which includes the detected events of the first event class, splitting the detection global profile into cliques, and calculating energy of the cliques in the detection global profile.

Typically, the method of the present embodiment further includes a step of flagging an anomaly if there is a deviation between the reference global profile and the detection global profile. A deviation may occur, for example, if a set of nodes in the detection global profile of the first event class is different from the set of nodes in the reference global profile of the first event class or there is a large variation in the energies of the cliques of the detection global profile of the first event class and the reference global profile of the first event class. Generally, more than one event class will be of interest. Therefore, in other embodiments, the method includes steps of (1) building a multitude of reference global profiles in which each reference global profile comprising a different event class, (2) building a multitude of detection global profiles in which each detection global profile corresponding to a reference global profile to produce corresponding detection global profiles, and (3) determining if there is at least one deviation from at least one of the multitude of reference global profiles and the corresponding detection global profile.

Another embodiment includes a system for detecting global anomalies. The system may include a network comprising a multitude of nodes and a hardware or software on the network. The hardware or software is typically configured to build a reference global profile of a first event class, build a detection global profile of a first event class, and determining if there is a deviation between the reference global profile and the detection global profile. Generally, the hardware or software is configured to record reference events of the first event class on a first node and generate a reference local profile comprising the reference events. The hardware or software is also generally configured to record reference events of the first event class on at least a portion of the multitude of nodes other than the first node and generate reference local profiles comprising the reference events on these nodes.

In some embodiments, the hardware or software is configured to exchange the reference local profiles among first node and the portion of the multitude of nodes other than the first node. In an alternative embodiment, the hardware or software is configured to compute a hash function for the first event class in which the hash function converts the first event class into a node address. In other embodiments, the hardware or software is configured to compute pair-wise correlations among the multitude of reference local profiles.

In some embodiments, the hardware or software is configured to generate a graph structure of the pair-wise correlations. The graph structure is typically a reference global profile of the first event class. In some embodiments, the hardware or software is configured to split the graph structure into a plurality of cliques. The hardware or software may also be configured to calculate an energy (E) of the cliques. In some embodiments, the hardware or software is configured to store the reference global profile and the energy of the cliques on the nodes that comprise the reference global profile of the first event class.

The hardware or software may be configured to build a detection global profile using a sliding window. The hardware or software is generally configured to build the detection global profile after the building of the reference global profile of the first event class. Further, the hardware or software may be configured to record detection events of the first event class, generate detection profiles, compute pair-wise correlations among the detection profiles, generate a graph structure of the pair-wise correlations of the detection profiles, split the graph structure into cliques, and calculate energy of the cliques.

Typically, the hardware or software is configured to flag an anomaly if a set of nodes in the detection global profile of the first event class is different from the set of nodes in the reference global profile of the first event class or there is a large variation in the energies of the cliques of the detection global profile of the first event class and the reference global profile of the first event class. The hardware or software may also be configured to build a multitude of reference global profiles in which each reference global profile includes a different event class. The hardware or software may also be configured to build a multitude of detection global profiles in which each detection global profile corresponds to a reference global profile. The hardware or software may also be configured to determine if there is at least one deviation from at least one of the multitude of reference global profiles and the corresponding detection global profile.

Another embodiment includes a system for detecting global anomalies including a network with a multitude of nodes, means for building at least one reference global profile of a first event class; means for building at least one detection global profile of a first event class, and means for determining if there is a deviation from the reference global profile and the detection global profile. In this embodiment, the means for building a reference global profile of a first event class comprises means for recording reference events of the first event class on a first node and means for generating a local profile comprising the reference events.

In one embodiment, the means for building at least one reference global profile of a first event class includes means for recording reference events of the first event class on at least a portion of the plurality of nodes other than the first node and means for generating local profiles comprising the reference events. The system may also include means for exchanging the local profiles among first node and the portion of the plurality of nodes. In one embodiment, the system may also include means for computing a hash function for the first event class and means for converting the hash function of the first event class into a node address. In another embodiment, the system includes means for computing pair-wise correlations among the plurality of local profiles.

In one embodiment, the system includes means for generating a graph structure of the pair-wise correlations. The graph structure typically representing a reference global profile of the first event class. The system may also include means for splitting the graph structure into a plurality of cliques. The system may further include means for calculating an energy (E) of the cliques. Additionally, the system may further include means for storing the reference global profile and the energy of the cliques on the nodes which include the reference global profile of the first event class.

The system may include means for building a detection global profile using a sliding window. The system may further include means for recording detection events of the first event class, means for generating detection profiles, means for computing pair-wise correlations among the detection profiles, means for generating a graph structure of the pair-wise correlations of the detection profiles, means for splitting the graph structure into cliques, and means for calculating energy of the cliques.

The system may further include means for flagging an anomaly if a set of nodes in the detection global profile of the first event class is different from the set of nodes in the reference global profile of the first event class or there is a large variation in the energies of the cliques of the detection global profile of the first event class and the reference global profile of the first event class. Further, the system may include means for building a multitude of reference global profiles in which each reference global profile includes a different event class. The system may include means for building a plurality of detection global profiles in which each detection global profile correspond to a reference global profile. Further, the system may include means for determining if there is at least one deviation from at least one of the plurality of reference global profiles and the corresponding detection global profile.

Figure 1:
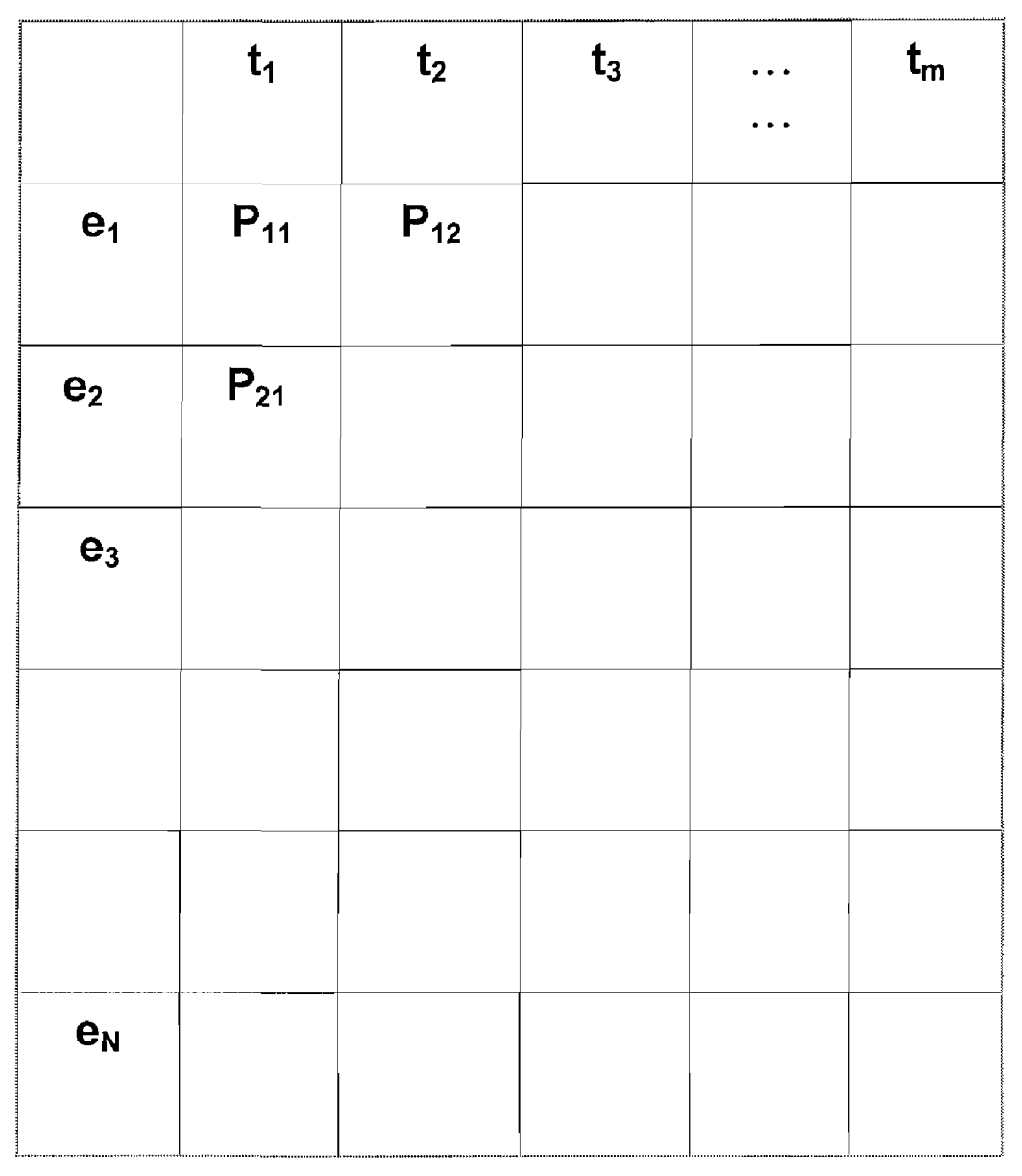

FIG. 1 illustrates a matrix of probabilities of observed events according to an embodiment. The symbols $e_1$, $e_2$, $e_3$, $e_N$, correspond to various event classes. Event instances for the various event classes $e_1$, $e_2$, $e_3$, $e_N$ are observed in time intervals $t_1$, $t_2$, $t_3$, $t_m$. After a suitable number of epochs, the probabilities $P_{11}$, $P_{12}$, $P_{21}$ of events of event classes $e_1$, $e_2$, $e_3$, $e_N$ occurring in time intervals $t_1$, $t_2$, $t_3$, $t_m$ are calculated. In one embodiment, events of all event classes $e_1$, $e_2$, $e_3$, $e_N$ are observed on all nodes of the network. However, in other embodiments, fewer than all event classes $e_1$, $e_2$, $e_3$, $e_N$ are observed on all nodes. Indeed, in some embodiments no event instances are observed on one or more nodes. That is, any number of event classes $e_1$, $e_2$, $e_3$, $e_N$ may be observed on some, all, or none of the nodes of the network. The probabilities $P_{11}$, $P_{12}$, $P_{21}$ may be compiled as histograms or functions.

The probabilities $P_{11}$, $P_{12}$, $P_{21}$ of events of event classes $e_1$, $e_2$, $e_3$, $e_N$ occurring in time intervals $t_1$, $t_2$, $t_3$, $t_m$ on the various nodes may be conveniently referred to as local profiles. In one embodiment, once the probabilities $P_{11}$, $P_{12}$, $P_{21}$ are calculated, the local profiles are exchanged with all the other nodes in the network. Once all of the local profiles are exchanged with all of the other nodes, pair-wise correlations may be calculated between the local profiles. In one embodiment, the pair-wise correlations are determined with Pearson coefficients. Pearson coefficients return a value of 1 for a perfect correlation and −1 for a perfect negative correlation. Values close to 0 show essentially no correlation. In alternative embodiments, different algorithms may be used to determine the correlations.

Rather than exchange the local profiles with the other nodes in the network, in an alternative embodiment, a hash function can be computed for each event class. The hash function converts an event class into a node address. The various local profiles of a particular event class are then sent to the node with the address that is returned by the hash function. In this embodiment, the total number of communications is reduced relative to the previous embodiments.

Once the pair-wise correlations are determined, those nodes having high correlations can be illustrated in a graph. The threshold value for a "high" correlation may vary on the event class and the desired level of security. Factors to consider in setting a threshold include, but are not limited to severity of the event under consideration, the variance in its normal behavioral profile, the implications of false alarms.

FIG. 2 illustrates an event correlation graph according to an embodiment. In this example, there are five event classes $e_1$, $e_2$, $e_3$, $e_4$, $e_5$ and five nodes $N_1$, $N_2$, $N_3$, $N_4$, $N_5$. Each of the high pair-wise correlations are illustrated as line connecting the appropriate nodes $N_1$, $N_2$, $N_3$, $N_4$, $N_5$.

Figure 3:
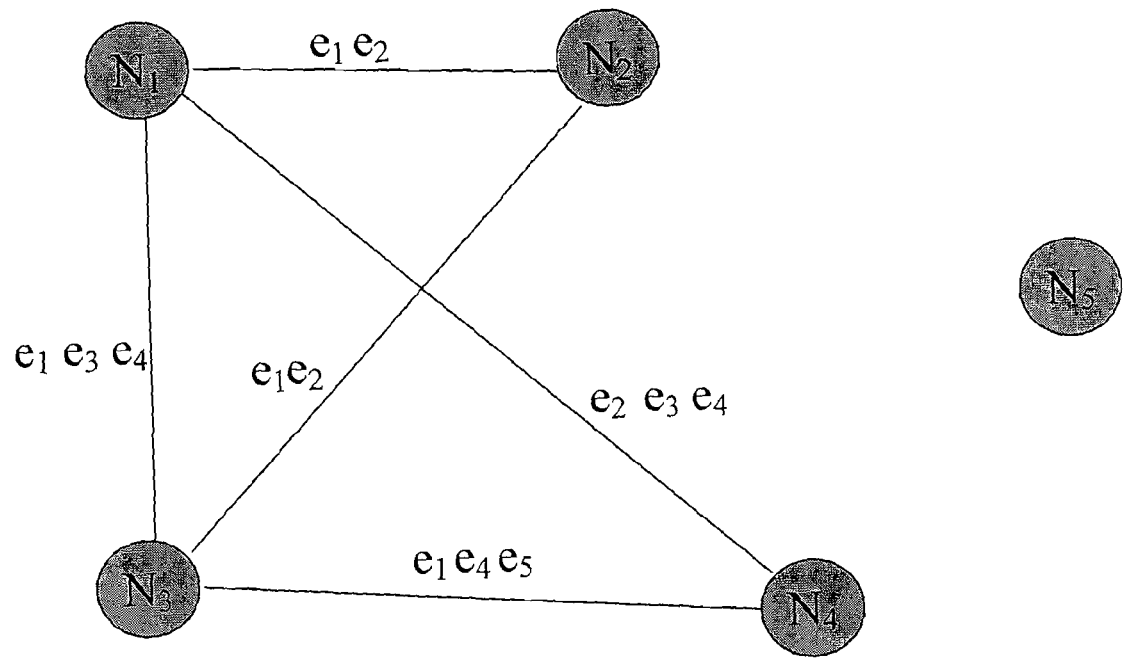
FIG. 3 is an event correlation graph according to another embodiment.

FIG. 3 an alternative illustration of the pair-wise correlations of the example illustrated in FIG. 2. In this embodiment, nodes that are highly correlated are connected with a single line. However, those nodes that are highly correlated with more than one event class are labeled with multiple event class labels. For example, nodes $N_1$ and $N_3$ are connected and labeled with $e_1$, $e_3$, and $e_4$. Thus, nodes $N_1$ and $N_3$ are highly correlated with events $e_1$, $e_3$, and $e_4$.

Figure 4:
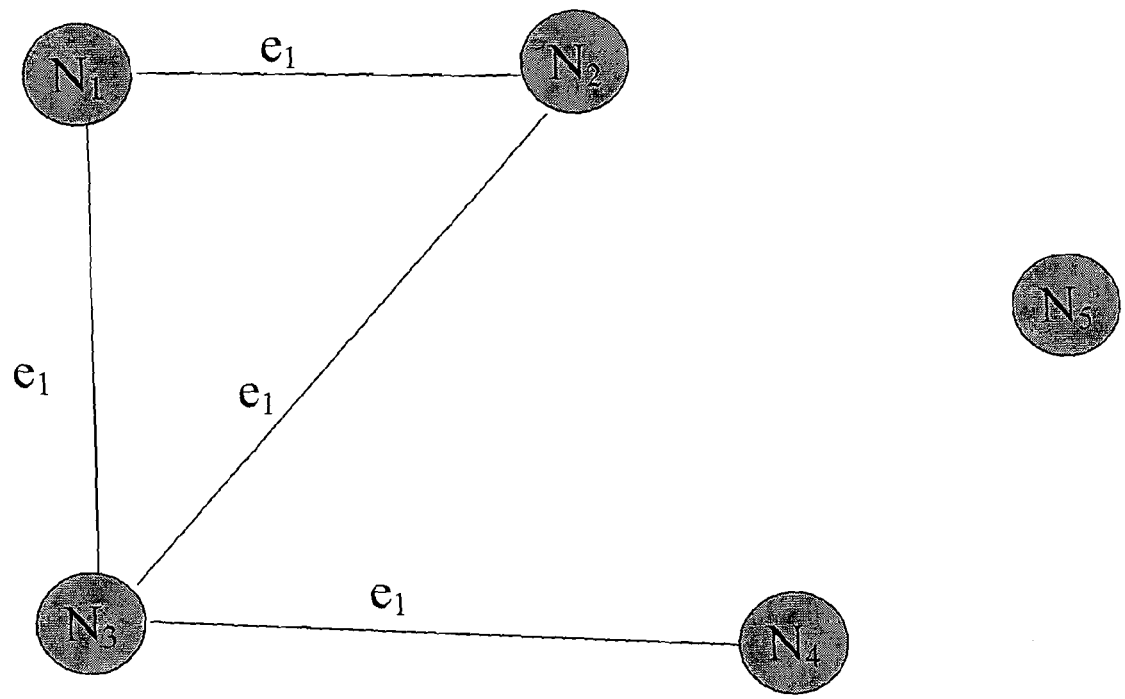
FIG. 4 is an event correlation graph of a single event class according to an embodiment.

FIG. 4 is an event correlation graph of a single event class according to an embodiment. This embodiment illustrates the pair-wise correlations of event class $e_1$ of the previous example. That is, this embodiment illustrates a global profile of the first event class $e_1$.

Figure 5:
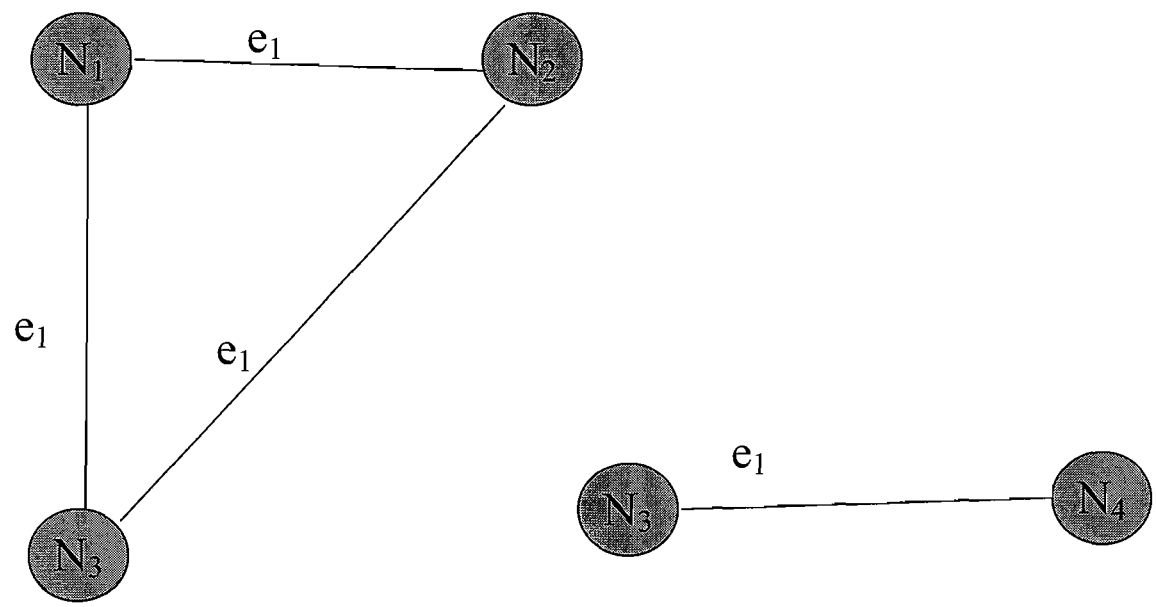
FIG. 5 is an event correlation graph divided into maximal cliques according to an embodiment.

In another embodiment, the global profile of a single event class is divided into cliques. FIG. 5 illustrates the division of the first event class $e_1$ correlation graph of FIG. 4 divided into cliques. In this example, event class $e_1$ is divided into two cliques. Further, in both cliques every node is connected to every other node. Thus, both of the illustrated cliques are maximal.

Dividing the global profile of an event class into maximal cliques is typically useful for storage of the global profile. Because every node is connected to every other node in a maximal clique, it is sufficient to store the set of nodes that form the maximal clique. That is, it is not necessary to also include information indicating the connections between the nodes. Thus, for the example illustrated in FIG. 5, storing the set: $\{N_1, N_2, N_3,\}$ and $\{N_3, N_4\}$ is sufficient to describe the global profile.

In another embodiment, an "energy" of the various cliques comprising the global profile is calculated. This energy is a measure of how well the events in the clique are correlated. Generally, a clique with n elements has $\frac{1}{2}(n*(n-1))$ different correlation metrics. In one embodiment, all of these correlation metrics are captured in a single energy value based on the following equation:

$$E = \frac{\mu}{1+\sigma^2}$$

where E is the energy, $\mu$ is the mean of the absolute correlation scores of the pair-wise correlations of the cliques and $\sigma^2$ is the variance. In alternative embodiments, the energy can be calculated with other algorithms. Other embodiments of computing the affinity of events within a group of nodes include representing the graph as a "Markov field" and calculating the "clique potential." Mathematically, the global normal behavior in terms of energy for a single event class can be represented as:

$$PE_{e1} = \{E_{C1}, E_{C2}, \ldots, E_{CN}\}$$

where $E_{C1}$ is the energy of clique 1. The global normal behavior of all event classes can be represented as:

$$PE = \{PE_{e1}, PE_{e2}, \ldots, PE_{eN}\}$$

In one embodiment, the result of the profiling phase is a reference global profile that includes a set of nodes corresponding to maximal cliques and the energies of the maximal cliques. This embodiment provides a compact record of sets of nodes with a corresponding energy score. In one aspect of this embodiment, the aforementioned global profile is stored on all nodes that contributed to the global profile of the event class profiled.

In one embodiment, the detection phase begins as soon as the reference global profile for an event class has been generated. In one embodiment, data is collected with a sliding window. For example, if the profiling phase was carried out across k epochs from $t_0$ to $t_{k-1}$, the detection phase starts from $t_k$ and uses all information from $t_1$ onwards. In one aspect of the embodiment, every time an event instance of that event class occurs on any node data from the sliding window is collected and a detection local profile is generated. The detection local profiles can then be exchanged and a detection global profile generated in the same manner as the reference global profile. Typically, the set of nodes in the detection global profile is smaller than the set of all nodes on the network.

In one embodiment, detection global profiles comprising maximal cliques and their associated energies are determined. The detection global profiles are then compared to the reference global profile generated in the profiling phase. A global anomaly is flagged if either the set of nodes in the detection global profile differs from the set of nodes in the reference global profile or there is a large variation in the energies of the respective cliques.

Another embodiment includes a computer readable medium comprising a computer executable instructions for detecting global anomalies. The computer executable instructions are configured to build a reference global profile of a first event class, build a detection global profile of a first event class, and detect a deviation between the reference global profile and the detection global profile. In one aspect of this embodiment, the medium the computer executable instructions are configured to record reference events of the first event class on a first node of a network comprising a plurality of nodes and generate a reference local profile comprising the reference events. In another aspect, the computer executable instructions are configured to record reference events of the first event class on at least a portion of the plurality of nodes other than the first node and generate reference local profiles comprising the reference events.

In another aspect, the computer executable instructions are configured to exchange the reference local profiles among first node and the portion of the plurality of nodes other than the first node. In another aspect, the computer executable instructions are configured to compute a hash function for the first event class and the hash function converts the first event class into a node address. In another aspect, the computer executable instructions are configured to compute pair-wise correlations among the plurality of reference local profiles.

In a further aspect, the computer executable instructions are configured to generate a graph structure of the pair-wise correlations, the graph structure comprising a reference global profile of the first event class. In another aspect, the computer executable instructions are configured to split the graph structure into a plurality of cliques. In another aspect, the computer executable instructions are configured to calculate an energy (E) of the cliques. In another aspect, the computer executable instructions are configured to store the reference global profile and the energy of the cliques on the nodes that comprise the reference global profile of the first event class.

In one aspect, the computer executable instructions are configured to build a detection global profile using a sliding window. In another aspect, the computer executable instructions are configured to record detection events of the first event class, generate detection profiles, compute pair-wise correlations among the detection profiles, generate a graph structure of the pair-wise correlations of the detection profiles, split the graph structure into cliques, and calculate energy of the cliques. In a further aspect, the computer executable instructions are configured to flag an anomaly if a set of nodes in the detection global profile of the first event class is different from the set of nodes in the reference global profile of the first event class or there is a large variation in the energies of the cliques of the detection global profile of the first event class and the reference global profile of the first event class. In another aspect, the computer executable instructions are configured to build a plurality of reference global profiles, each reference global profile comprising a different event class; build a plurality of detection global profiles, each detection global profile corresponding to a reference global profile to produce corresponding detection global profiles; and detect at least one deviation from at least one of the plurality of reference global profiles and the corresponding detection global profile.

EXAMPLES

Examples of various embodiments will now be described with reference to FIGS. 6-11. FIG. 9 is a block diagram illustrating an example of a method 100 according to one embodiment. The method includes steps of (1) building a reference global profile 110, (2) building a detection global profile 130, and (3) determining a deviation between the reference global profile and the detection global profile 140.

Building a Reference Profile

Figure 6:
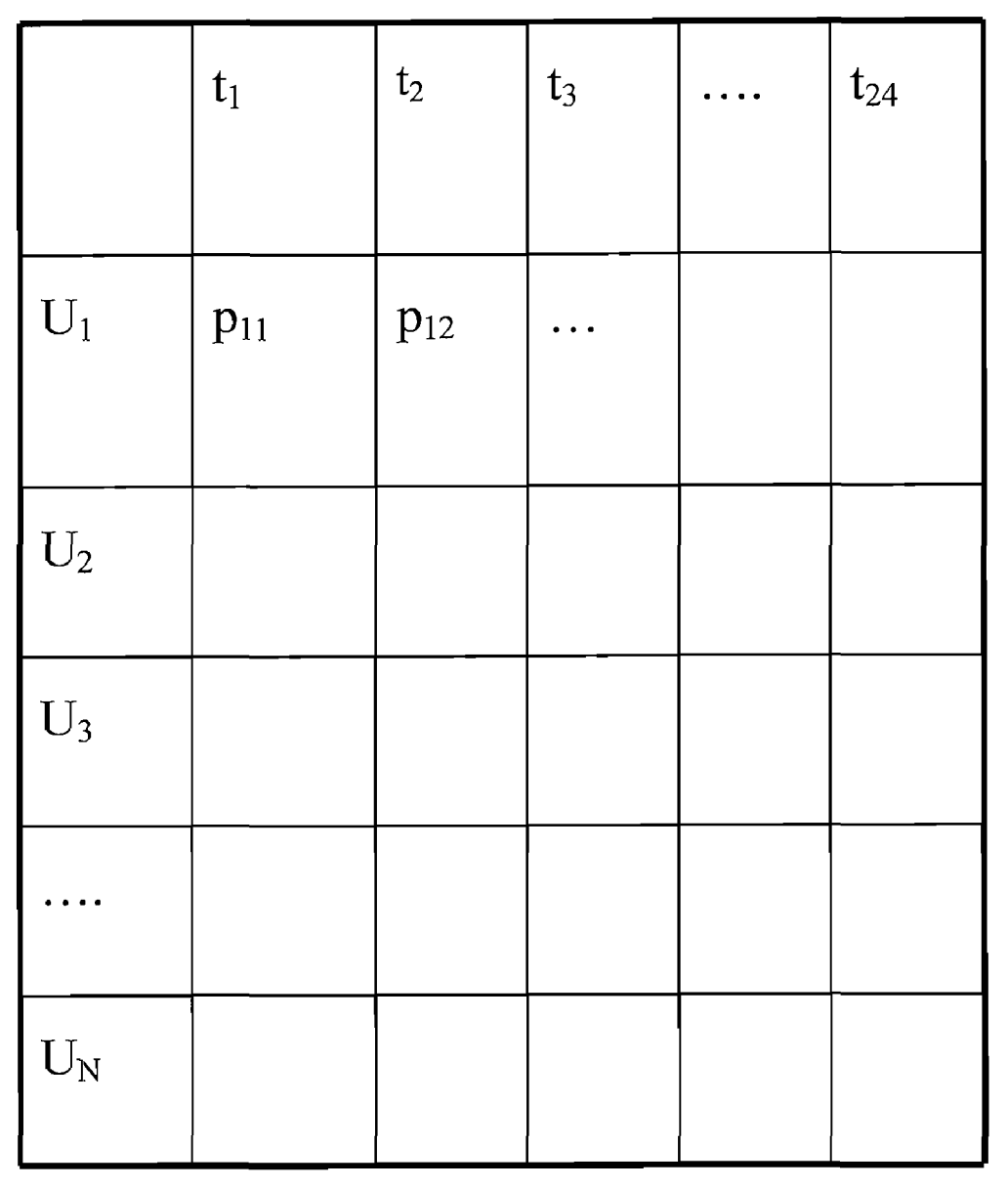
Figure 10:
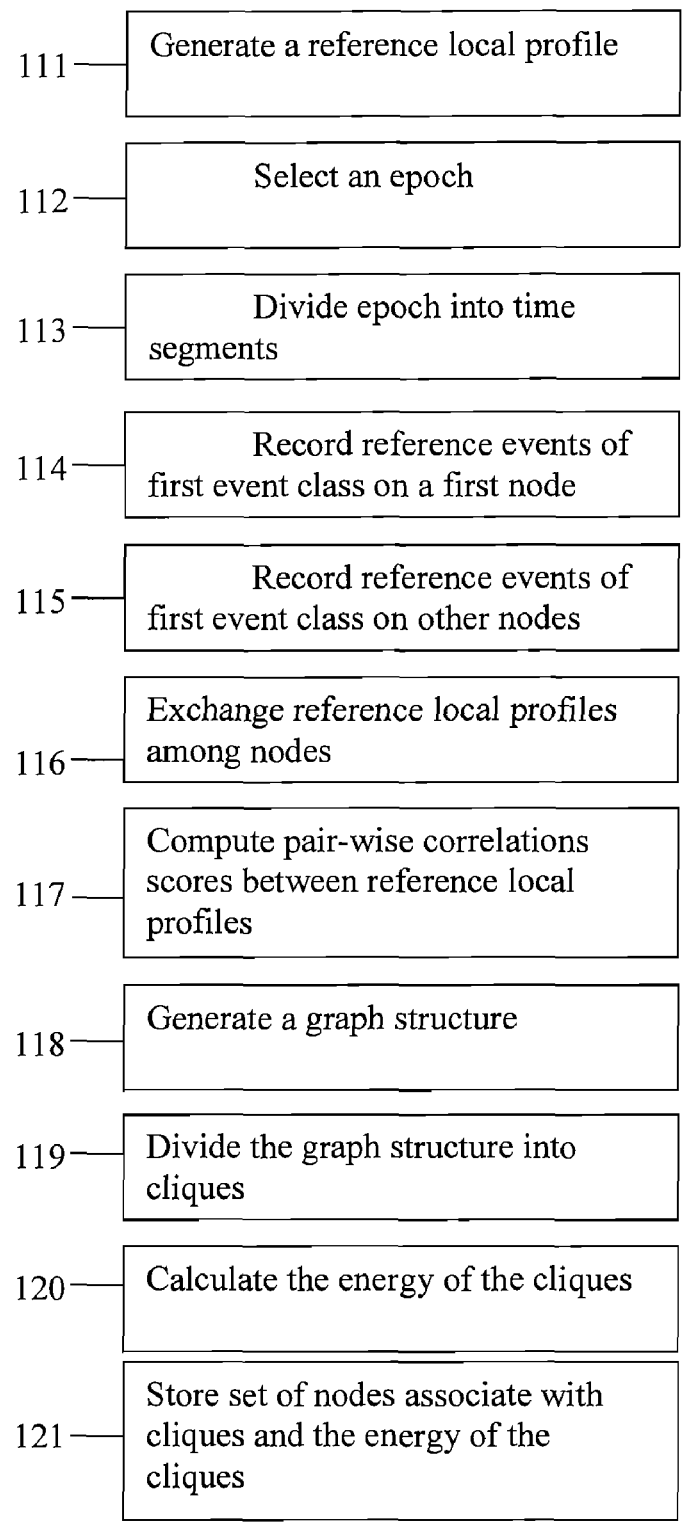
FIG. 10 is a block diagram illustrating additional details of the embodiment illustrated in FIG. 9.
Figure 11:
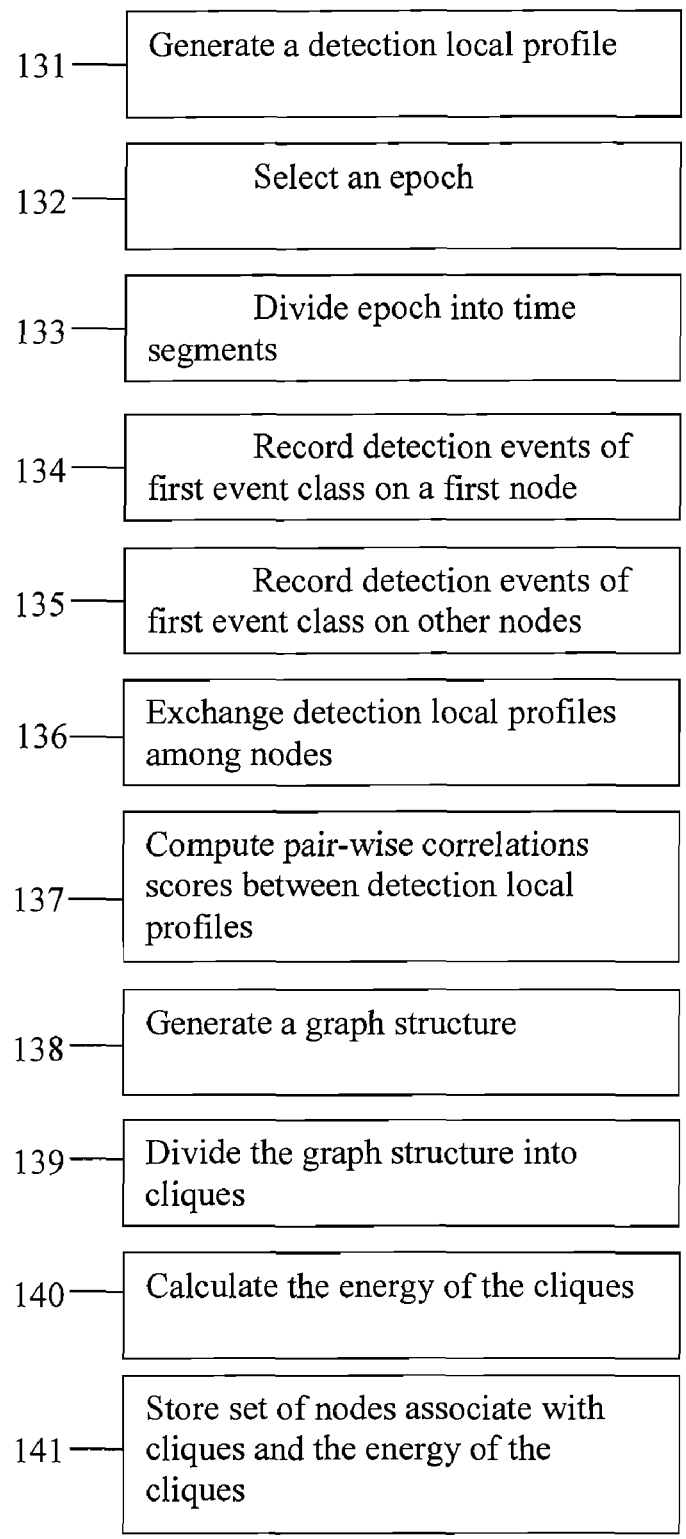
FIG. 11 is a block diagram illustrating additional details of the embodiment illustrated in FIG. 9.
Figure 2:
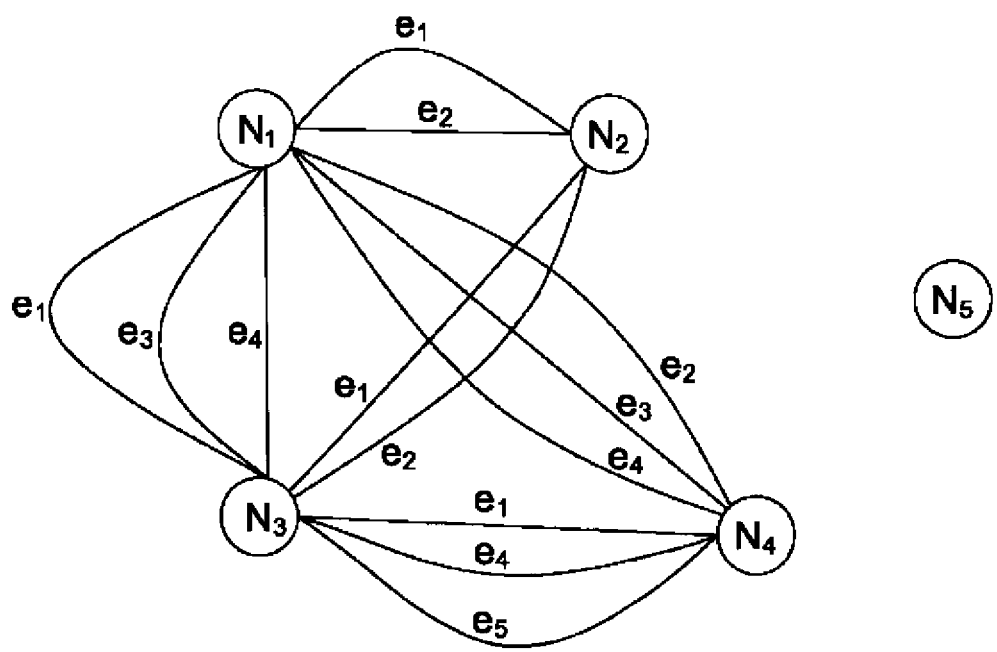
Figure 3:
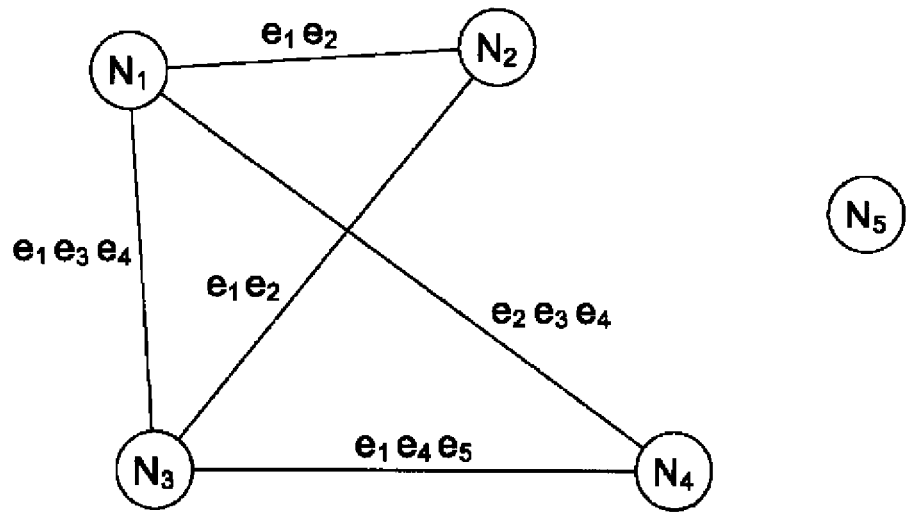
Figure 4:
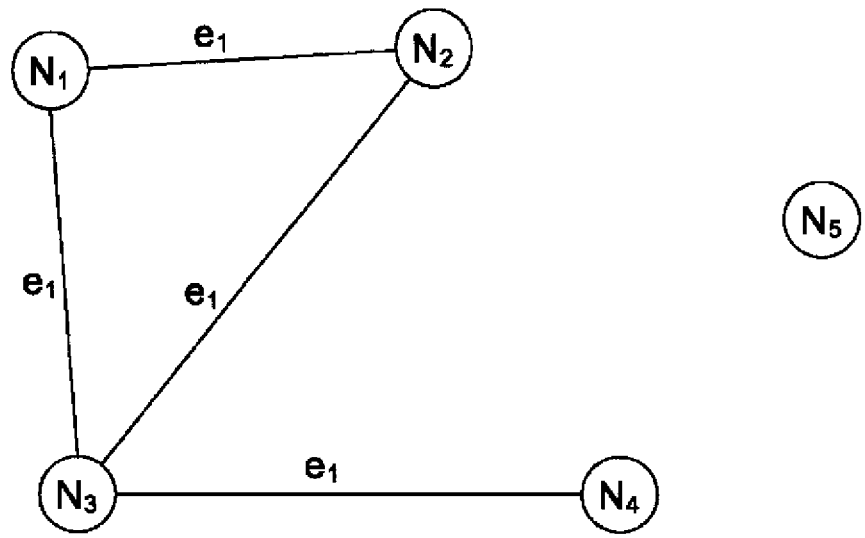
Figure 5:
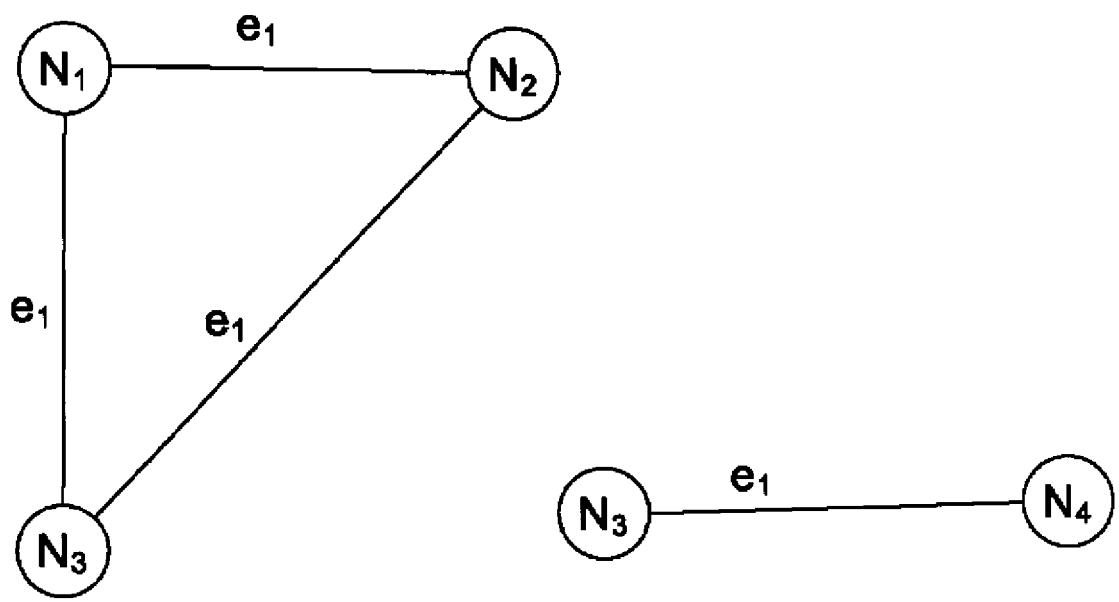
Figure 7:
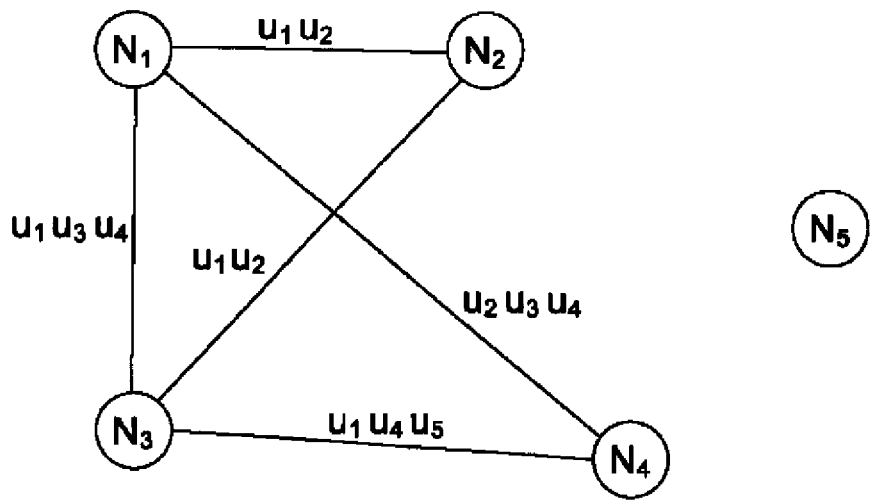
Figure 8:
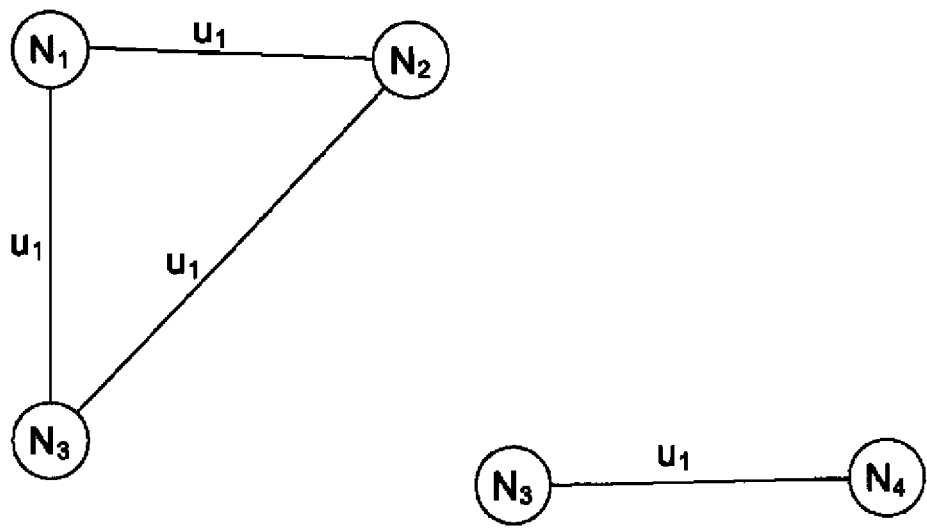
Figure 9:
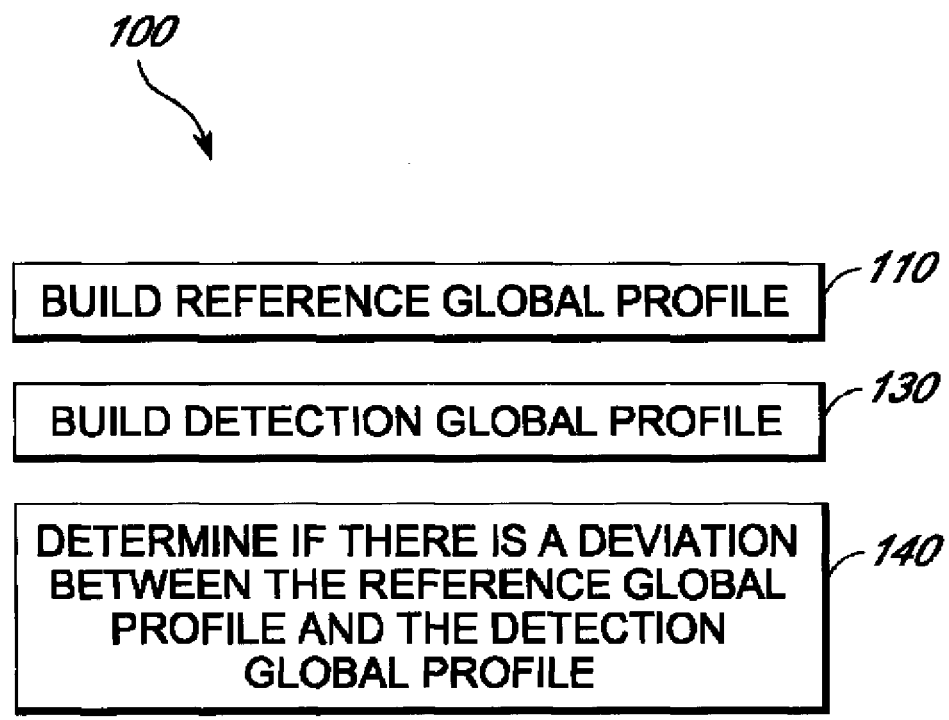
Figure 10:
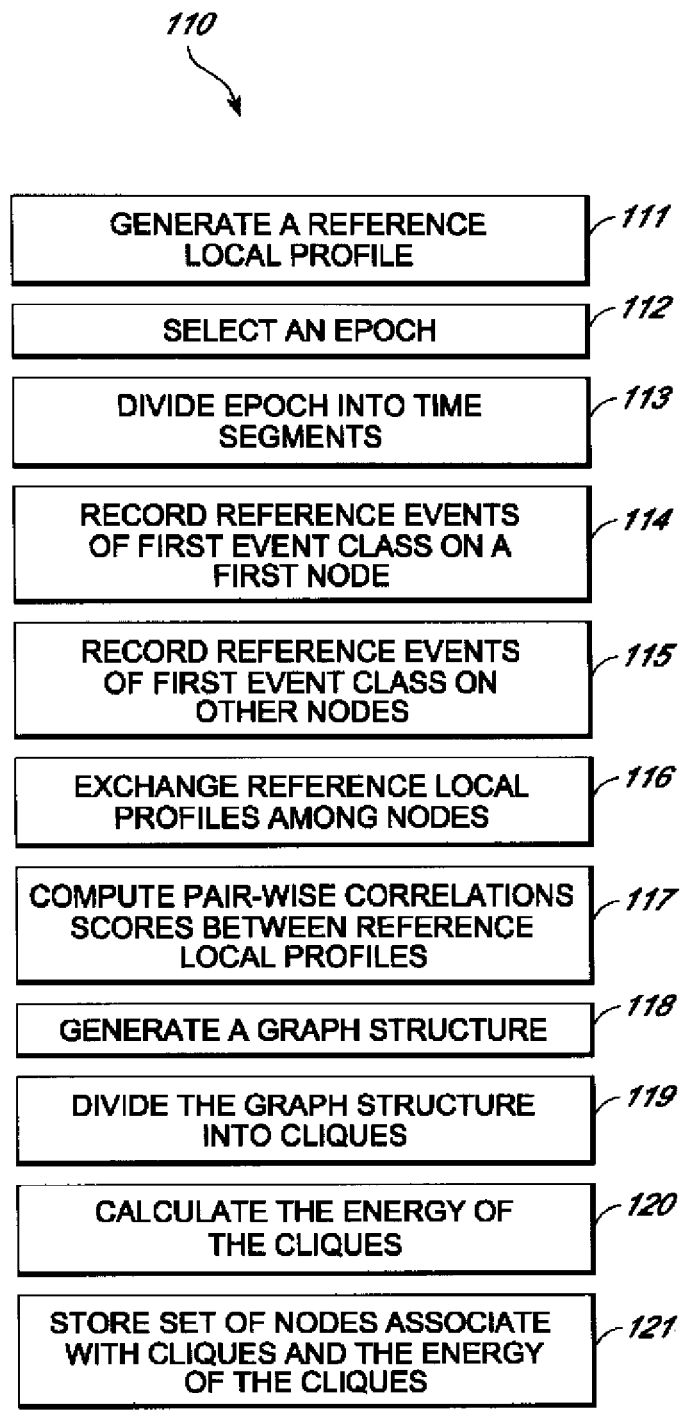
Figure 11:
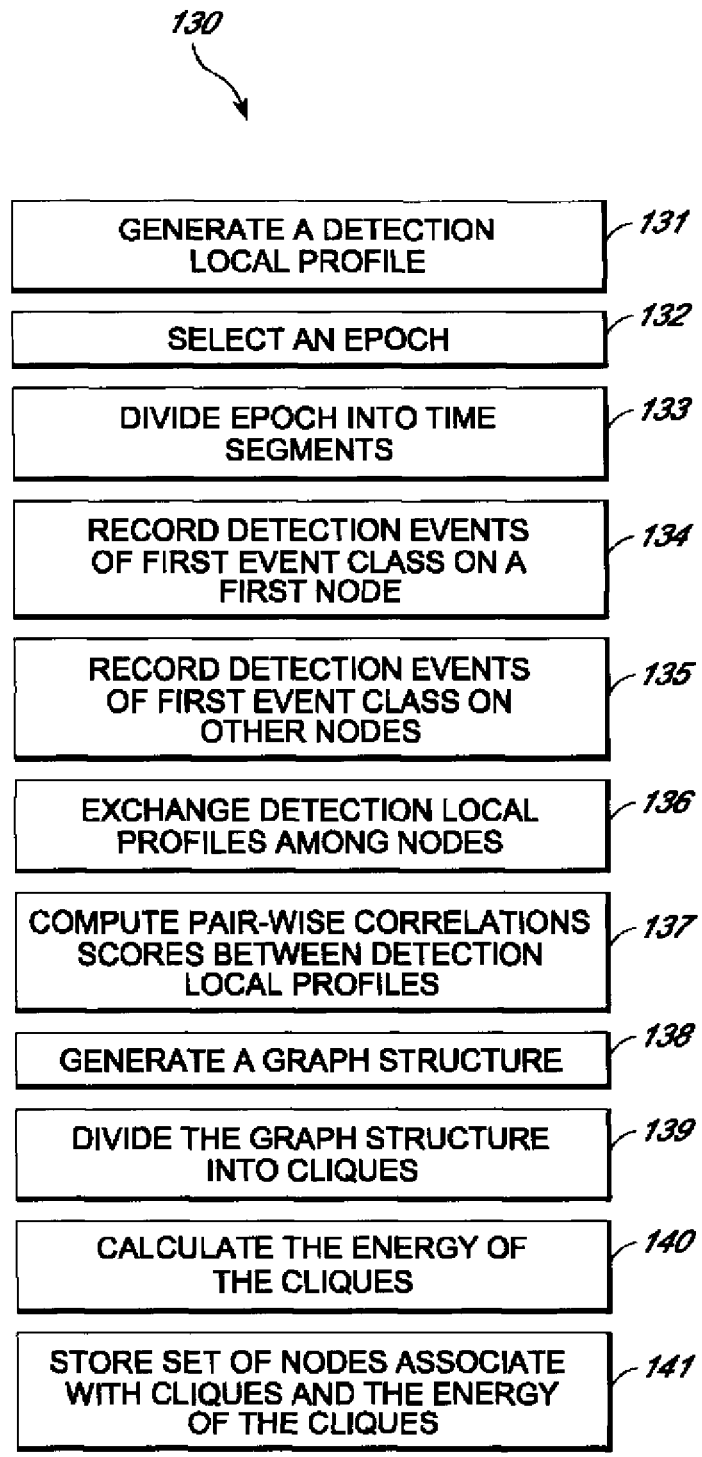
Figure 2:
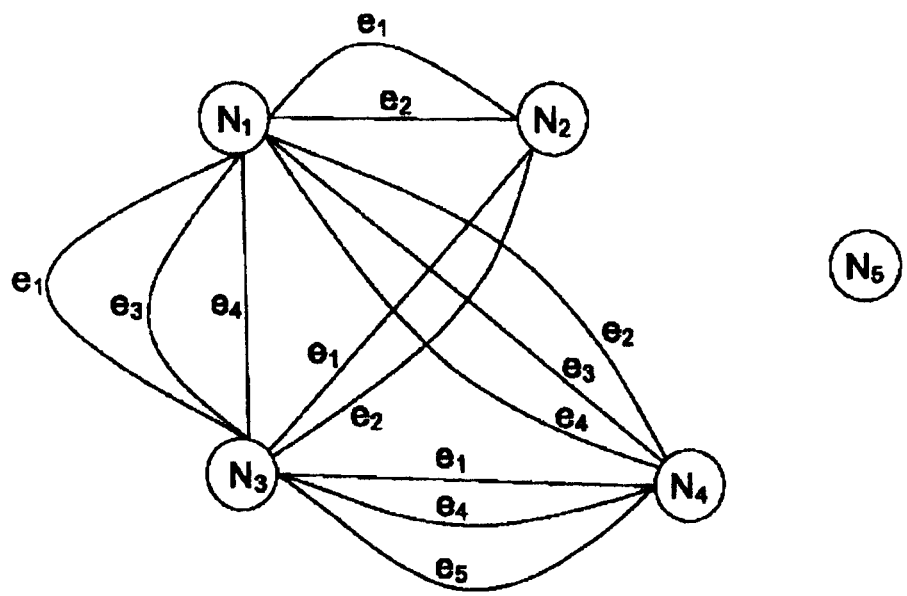
Figure 3:
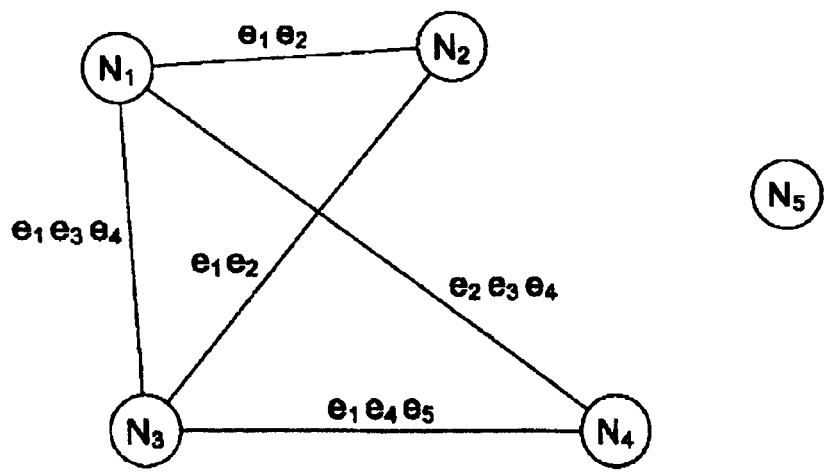
Figure 4:
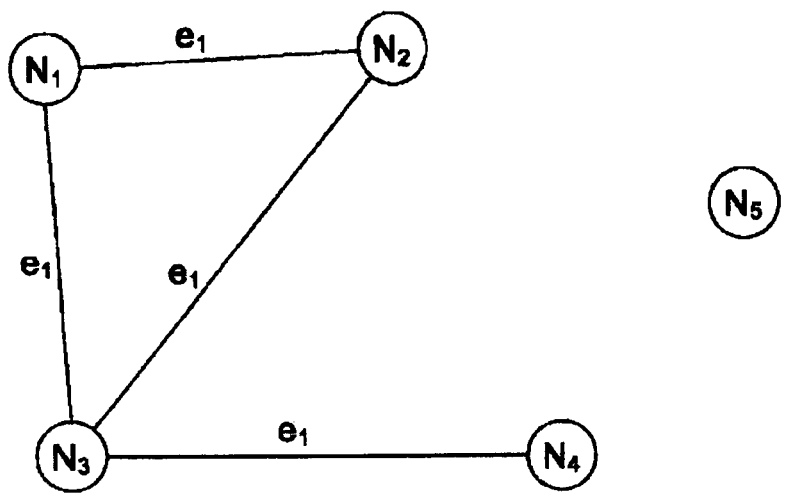
Figure 5:
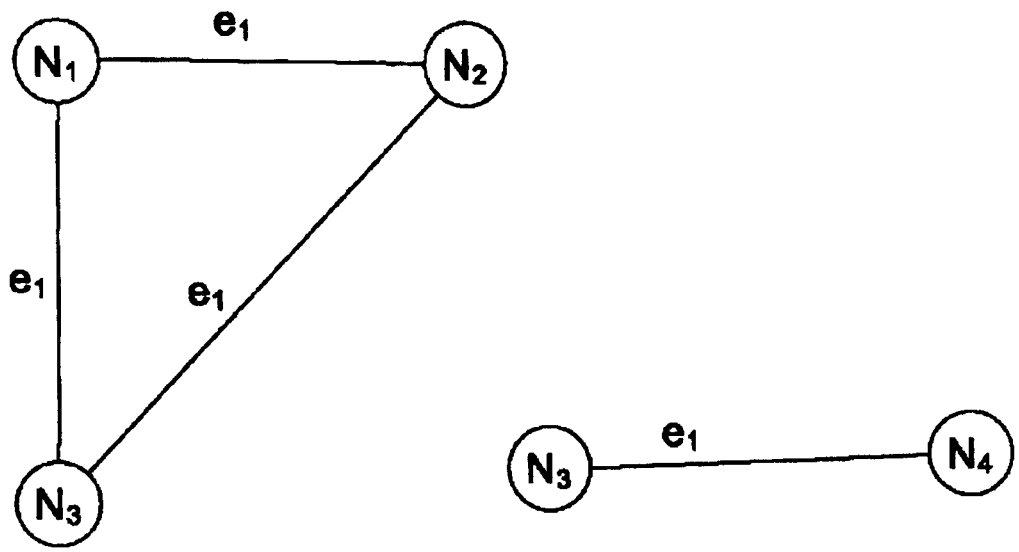
Figure 7:
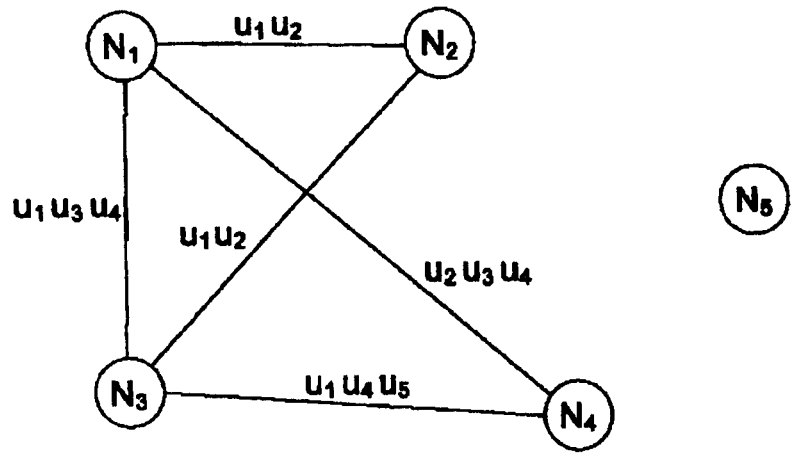
Figure 8:
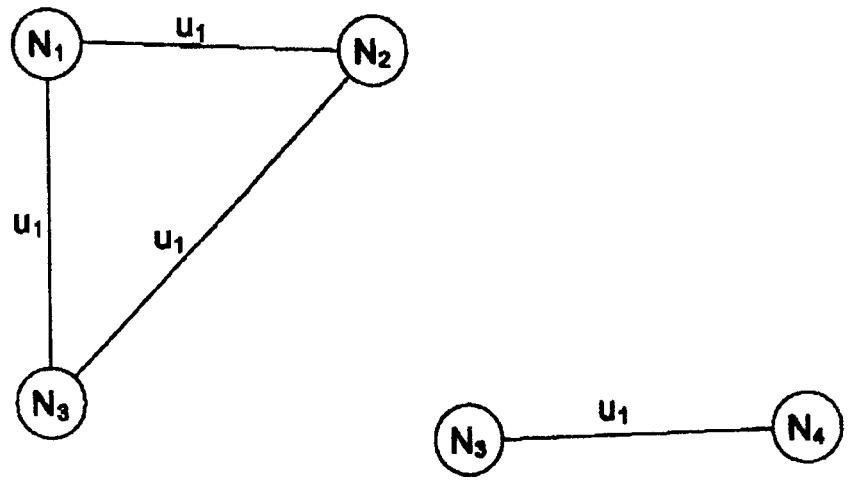
Figure 9:
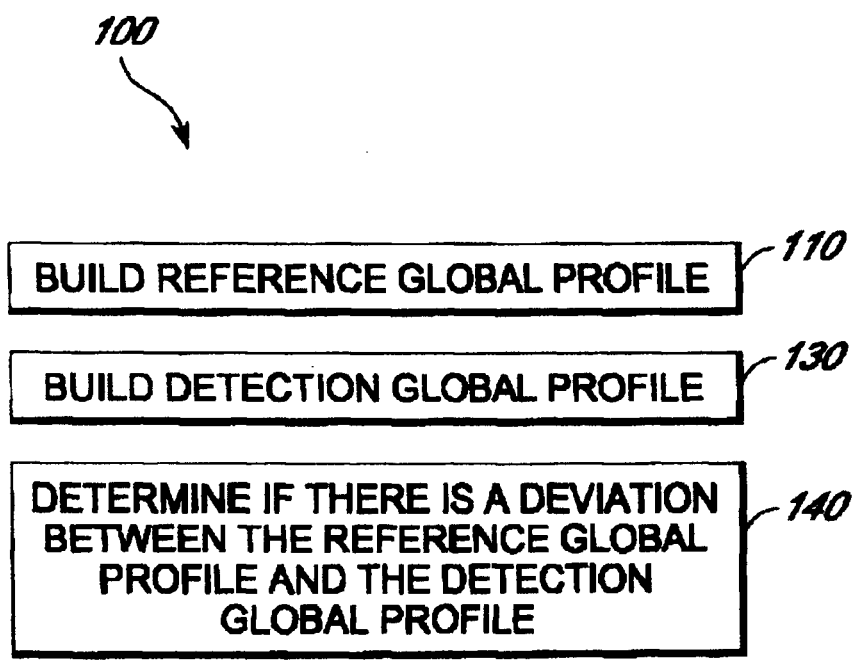
Figure 10:
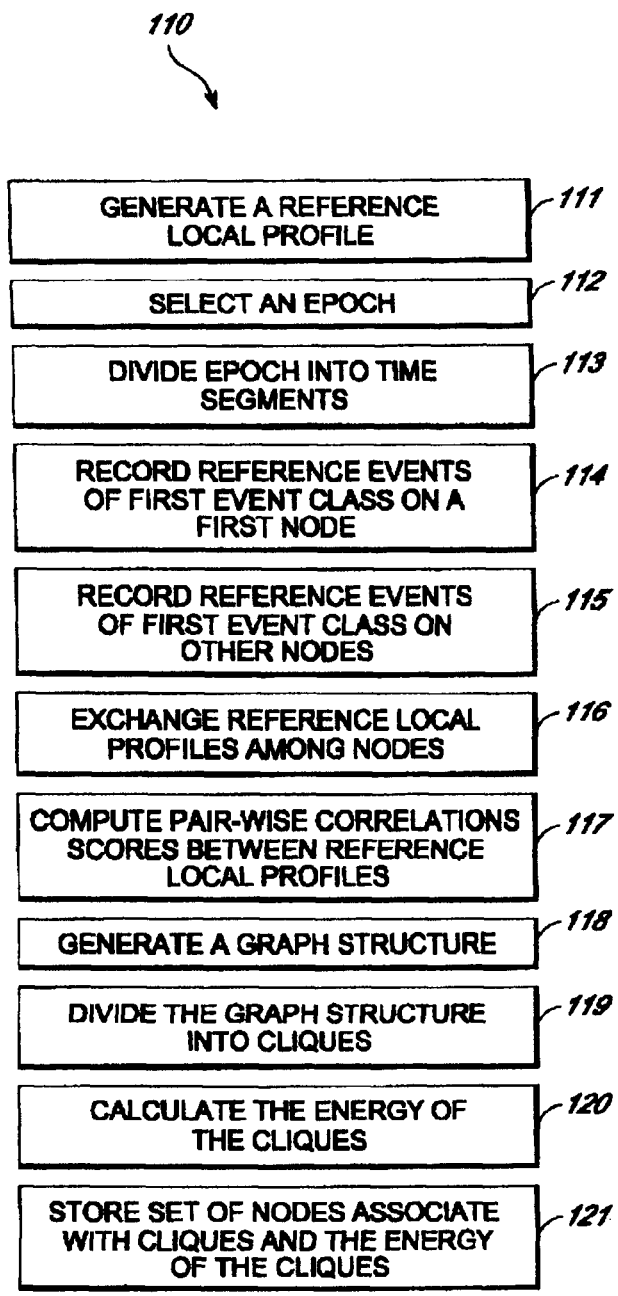
Figure 11:
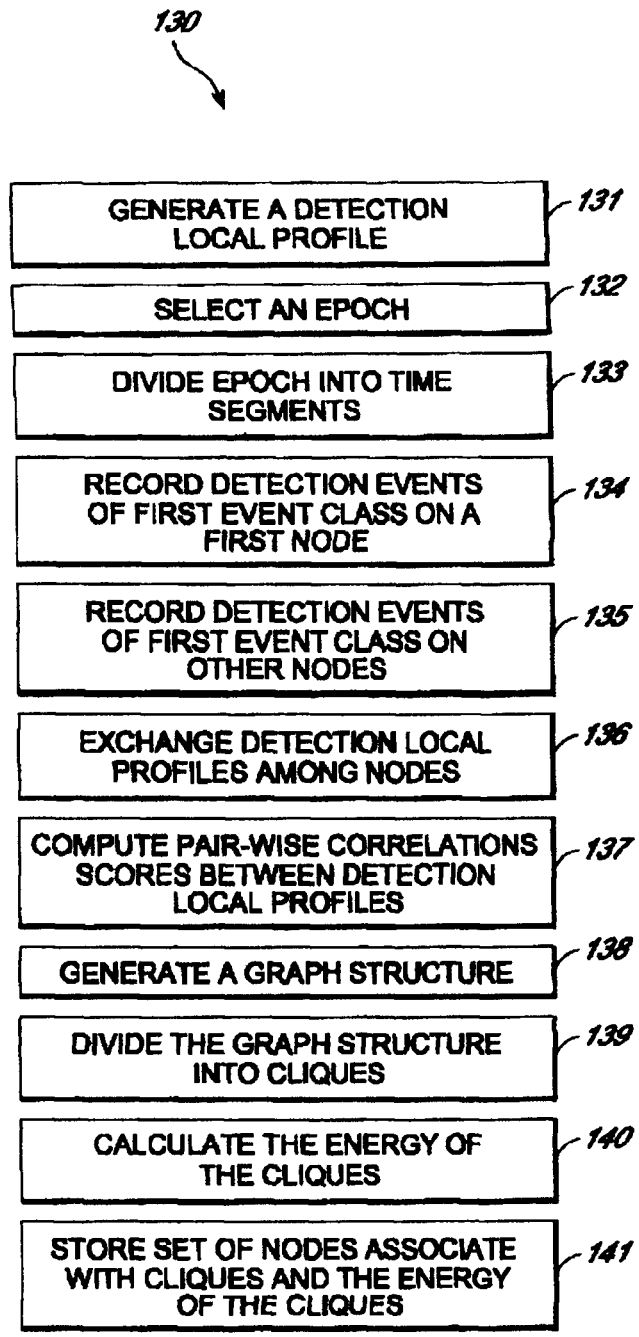

FIG. 6 illustrates a probability distribution of an example according to one embodiment. FIG. 10 is a block diagram illustrating additional details of the method of the embodiment. The first step in the method is to generate a local profile 111. Generating a local profile 111 includes the steps of (1) selecting an epoch, (2) dividing the epoch into time segments 112, and (3) recording reference events on the nodes of the network 113, 114. In this example, the login behavior of the various users on a network are of interest. FIG. 6 is an example of a table of probabilities for one node on the network. The symbols $U_1$, $U_2$, $U_3$, $U_N$, correspond to the logins various users. Logins for the various users $U_1$, $U_2$, $U_3$, $U_N$ on each node are observed in time segments $t_1$, $t_2$, $t_3$, ... $t_{24}$ of one hour over the course of a 24 hour (1 day) epoch on each node. After a suitable number of epochs, the probabilities $P_{11}$, $P_{12}$ of the logins of the various users $U_1$, $U_2$, $U_3$, $U_N$ occurring in time segments $t_1$, $t_2$, $t_3$, $t_{24}$ on each node are calculated. The probabilities $P_{11}$, $P_{12}$, may be compiled as histograms or functions. The table represents the local profile of the login events of the various users $U_1$, $U_2$, $U_3$, $U_N$ on the node.

In one aspect of this example, local profile are compiled on all of the nodes and exchanged with all the other nodes in the network 116. The nodes may be individual personal computers or servers on the network. Once all of the local profiles are exchanged with all of the other nodes, pair-wise correlations may be calculated between the local profiles 117. In an alternative aspect of this example, a hash function can be computed for each user $U_1$, $U_2$, $U_3$, $U_N$. The hash function converts the user into a node address. The various local profiles corresponding to a particular user $U_1$, $U_2$, $U_3$, $U_N$ can then be sent to the node with the address that is returned by the hash function.

Figure 7:
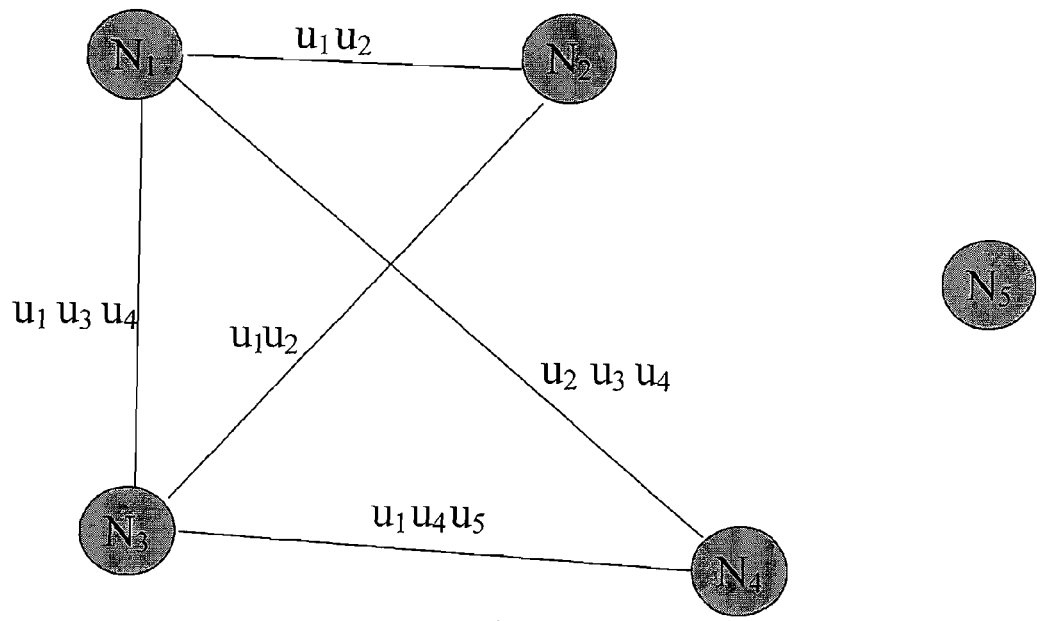
FIG. 7 is a schematic of an event correlation graph of the example of FIG. 6 according to an embodiment.

Once the pair-wise correlations are determined, those nodes having high correlations can be illustrated in a graph 118. FIG. 7 illustrates an event correlation graph according to an embodiment. The event correlation graph represents a reference global profile of all the users (that have logged in) and their login behavior observed in the profiling phase. In this example, nodes that are highly correlated are connected with a single line. Those nodes that are highly correlated with more than one user are labeled with multiple user labels. For example, nodes $N_1$ and $N_3$ are connected and labeled with $U_1$, $U_3$, and $U_4$. Thus, nodes $N_1$ and $N_3$ are highly correlated with users $U_1$, $U_3$, and $U_4$. That is, for example, in the profiling phase users $U_1$, $U_3$, and $U_4$ may have all logged into both severs $N_1$ and $N_3$.

Figure 8:
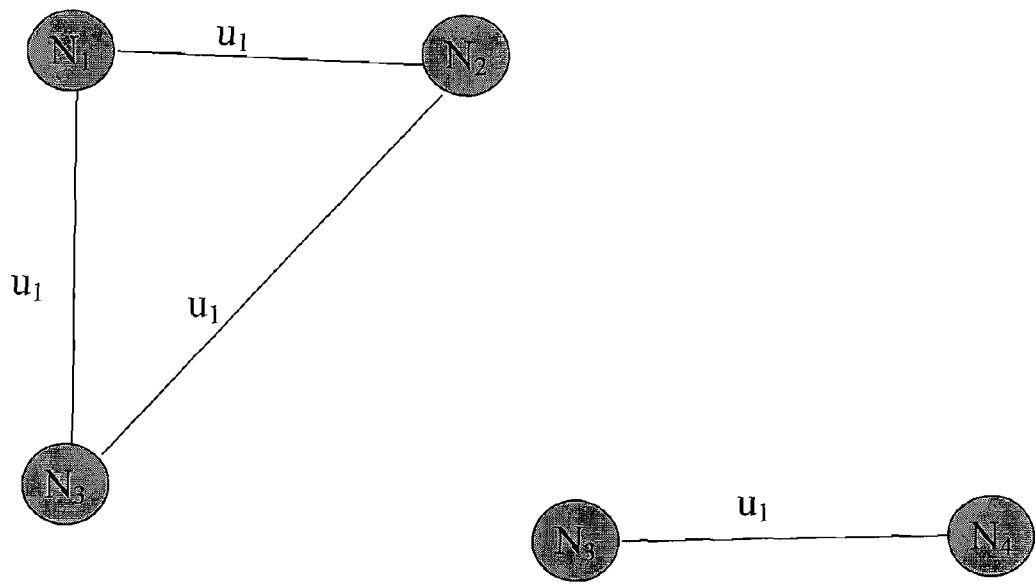
FIG. 8 is a schematic of an event correlation graph of the example of FIG. 6 according to another embodiment.
Figure 9:
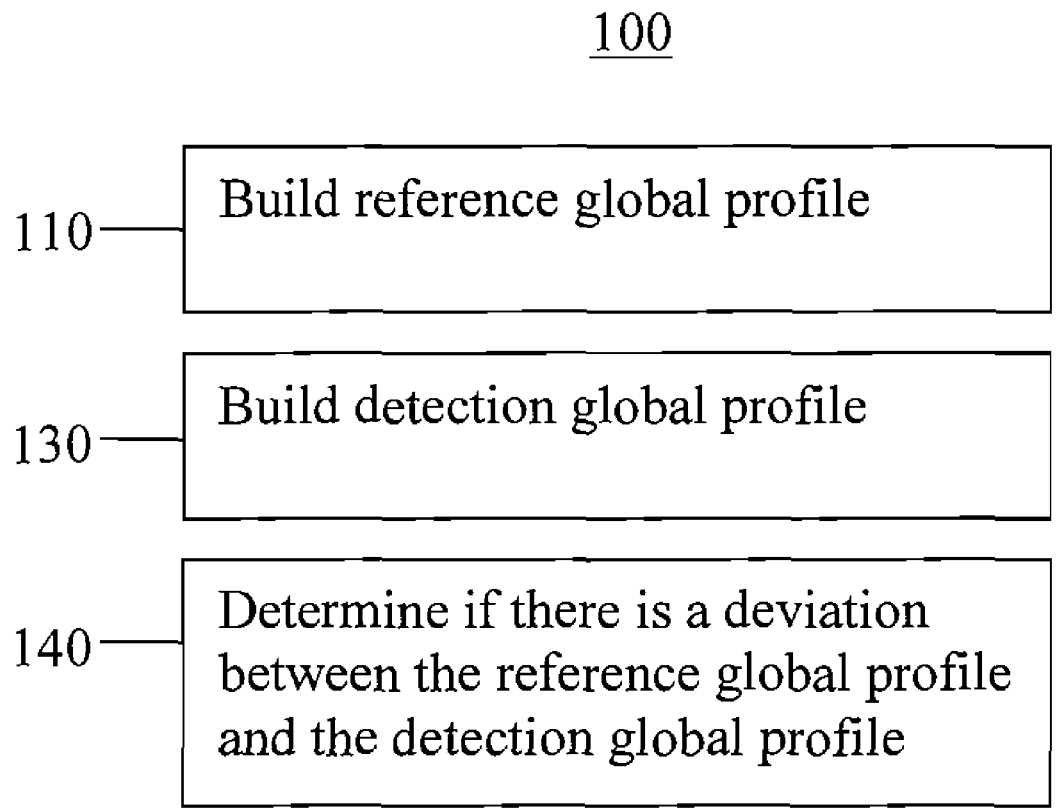
FIG. 9 is a block diagram illustrating an embodiment.

FIG. 8 illustrates the division of the login behavior of the first user $U_1$ divided into cliques 119. This graph may also be referred to as the reference global profile of user $U_1$. In this example, event class $e_1$ is divided into two cliques. In both cliques every node is connected to every other node. Thus, both of the illustrated cliques are maximal. After the cliques are determined, the energy of the cliques is calculated 121. The global behavior of the first user $U_1$ can be represented in terms of the energy of the maximal cliques (FIG. 8). Thus, the reference global profile for the first user $U_1$ can expressed as:

$$PE_{U1} = \{E_{C1} = \phi(N_1, N_2, N_3), E_{C2} = \phi(N_3, N_4)\}$$

This expression includes the set of nodes and the energy of the cliques which can be conveniently stored 121. Similar expressions can be calculated for each user.

Building a Detection Profile

In the detection phase, detection local profiles are generated 131. Generating detection local profiles 131 includes the steps of (1) selecting an epoch 132, (2) dividing the epoch into time segments 133, and (3) recording detection events on nodes of the network 134, 135. In the detection phase, the login behavior of the first user $U_1$ is monitored. Local profiles are generated on the nodes in which the first user $U_1$ performs a login 131. The local profiles are then exchanged 136, pair-wise correlations between detection local calculated 137, graphs generated 138, and cliques determined 139. Once the cliques are determined 139, the energy can be calculated 140. The global behavior of the first user $U_1$ in the detection phase may be expressed as:

$$PE^*_{U1} = \{E^*_{C1} = \phi(N_1, N_2, N_3), E^*_{C2} = \phi(N_3, N_4)\}$$

and stored 141.

Detecting a Global Anomaly

To find an anomaly in the login behavior on the network, the global detection profiles of the various users are compared to their corresponding global reference profiles 140. A global anomaly is flagged if either the set of nodes in the detection global profile differs from the set of nodes in the reference global profile or there is a large variation in the energies of the respective cliques. A detected anomaly, however, may or may not signal a problem. For example, the user may have been temporarily assigned to a different office or a different project resulting accessing different servers on the network. Typically, anomalies are flagged for further investigation. In this manner, legitimate anomalies can be sorted from malicious attacks.

System

An example of a system according to one embodiment may also be described with reference to FIGS. 6-8. The system includes a network with a multitude of nodes. The nodes may be individual personal computers or servers on the network. The system also includes hardware or software to detect anomalous behavior on the network. In the login example, the hardware or software tracks and records the logins of various users on each of the nodes in the network over a predetermined period of time to determine the "normal" behavior of the users of the network.

The hardware or software generates a probability distribution of logins as a function of time for each user on each node. The probability distribution represents the reference local profile of the user on the node. Thus, in one aspect of the system, the hardware or software includes reference local profiles of all of the users on all of the nodes. The hardware or software then exchanges the various reference local profiles and performs pair-wise correlations of each of the users on each of the nodes. The resulting correlations are then graphed to generate a reference global profile of the login behavior of all of the users the network. Thus, in another aspect, the system includes a reference global profile of the login behavior of all of the users on the network.

The hardware or software may then generate individual reference global profiles for each user. The individual reference global profile illustrates the login behavior of a particular user on the various nodes on the network. In one aspect of the embodiment, the individual reference global profiles are divided into cliques and the energy of each of the cliques is calculated. In this manner, a compact description of the reference global profile of each user may be stored on the system.

After the reference global profiles are generated and stored, the hardware or software begins to monitor the ongoing login behavior on the system. The hardware or software records the ongoing login events and generates detection local profiles for all of the users of the network. Thus, one aspect of the embodiment includes detection local profiles of the users of the network. In another aspect of the embodiment, the detection local profiles are exchanged with other nodes on the network and pair-wise correlations calculated. The pair-wise correlations are then graphed, resulting in a detection global profile of the network. Thus, one aspect of the embodiment includes a detection global profile of all of the logins of all of the users on the network.

In one aspect, the detection global profile is generated using the same number of epochs as was used in generating the reference global profile. Typically, this results in both global profiles being generated with roughly the same amount of data. The detection global profile may be generated with a sliding window. In this manner, old data drops out of the detection global profile as new data is collected.

In another aspect, a detection global profile is generated for each individual user. The individual global profiles may be divided into cliques and the energy of the cliques calculated. Thus, on aspect of the system includes compact detection global profiles of all of the users of the network.

What is claimed:

1. A computer-implemented method for detecting global anomalies associated with a multi-node network of computing devices, the method comprising:
    generating a reference global profile of a first event class at one or more nodes of the multi-node network, wherein generating the reference global profile of the first class event comprises:
        determining a probability distribution for a reference event of the first event class, wherein the probability distribution is associated with a number of occurrences of the reference event of the first event class that occur over time at each node of the multi-node network;
        identifying one or more groups of nodes that have a correlation with the probability distribution for the reference event of the first event class, wherein the one or more groups of nodes include a portion of a total number of nodes in the multi-node network; and
        generating a reference energy for each of the groups of nodes that correlate with the probability distribution for the reference event of the first event class;
    generating a detection global profile of the first event class at one or more nodes of the multi-node network, wherein generating the detection global profile of the first class event comprises:
        determining a probability distribution for a detection event of the first event class, wherein the probability distribution is associated with a number of occurrences of the detection event of the first event class that occur over time at each node in the one or more groups of nodes that have the correlation for the reference event of the first event class; and
        generating a detection energy for each of the groups of nodes that correlate with the probability distribution for the reference event of the first event class;
    comparing, at one or more nodes in the multi-node network, the reference energy with the detection energy for each of the groups of nodes having the correlation for the reference event of the first event class; and
    determining if there is a deviation between the reference global profile and the detection global profile.

2. The method of claim 1, wherein determining a probability distribution for the reference event of the first event class comprises:
    selecting an epoch;
    dividing the epoch into time segments; and
    recording the reference event of the first event class occurring on each node in the multi-node network during the epoch.

3. The method of claim 2, wherein the probability distribution for the reference event of the first event class is generated using a plurality of epochs.

4. The method of claim 1, wherein identifying one or more groups of nodes that have a correlation with the probability distribution for the reference event of the first event class comprises:
    computing pair-wise correlation scores from the probability distribution for the reference event of the first event between each node on the multi-node network.

5. The method of claim 4, wherein determining the probability distribution for the reference event of the first event class comprises computing a hash function that converts the first event class into a node address.

6. The method of claim 4, wherein the pair-wise correlation scores comprise Pearson coefficients.

7. The method of claim 4, wherein the reference energy (E) is calculated by $$E = \frac{\mu}{1+\sigma^2}$$

wherein μ is a mean of the absolute value of the pair-wise correlation scores between each node in a group of nodes that have a correlation and $\sigma^2$ is the variance.

8. The method of claim 1, wherein generating a detection global profile comprises using a sliding window.

9. The method of claim 1, further comprising:
    generating a plurality of reference global profiles, each reference global profile comprising a different event class;

generating a plurality of detection global profiles, each detection global profile corresponding to a reference global profile to produce corresponding detection global profiles; and determining if there is at least one deviation from at least one of the plurality of reference global profiles and the corresponding detection global profile.

10. A system for detecting global anomalies associated with a multi-node network of computing devices, the system comprising:

a multi-node network comprising a plurality of computing devices, wherein one or more of the computing devices on the multi-node network are configured to:

generate a reference global profile of a first event class, wherein generate the reference global profile of the first class event comprises:

determine a probability distribution for a reference event of the first event class, wherein the probability distribution is associated with a number of occurrences of the reference event of the first event class that occur over time at each node of the multi-node network;

identify one or more groups of nodes that have a correlation with the probability distribution for the reference event of the first event class, wherein the one or more groups of nodes include a portion of a total number of nodes in the multi-node network; and generate a reference energy for each of the groups of nodes that correlate with the probability distribution for the reference event of the first event class;

generate a detection global profile of a first event class, wherein generate the detection global profile of the first class event comprises:

determine a probability distribution for a detection event of the first event class, wherein the probability distribution is associated with a number of occurrences of the detection event of the first event class that occur over time at each node in the one or more groups of nodes that have the correlation for the reference event of the first event class; and generate a detection energy for each of the groups of nodes that correlate with the probability distribution for the reference event of the first event class;

compare the reference energy with the detection energy for each of the groups of nodes having the correlation for the reference event of the first event class; and determine if there is a deviation between the reference global profile and the detection global profile.

11. The system of claim 10, wherein the one or more computing devices are further configured to compute a hash function for the first event class and the hash function converts the first event class into a node address.

12. The system of 10, wherein the one or more computing devices are further configured to compute pair-wise correlations scores from the probability distribution for the reference event of the first event between each node on the multi-node network.

13. The system of 10 wherein the one or more computing devices are further configured to build a detection global profile using a sliding window.

14. The system of 10, wherein the one or more computing devices are further configured to:

generate a plurality of reference global profiles, each reference global profile comprising a different event class;

generate a plurality of detection global profiles, each detection global profile corresponding to a reference global profile to produce corresponding detection global profiles; and determine if there is at least one deviation from at least one of the plurality of reference global profiles and the corresponding detection global profile.

15. A system for detecting global anomalies comprising:

a multi-node network comprising a plurality of computing devices;

means for generating at least one reference global profile of a first event class, wherein generating at least one reference global profile of a first event class comprises:

means for determining a probability distribution for a reference event of the first event class, wherein the probability distribution is associated with a number of occurrences of the reference event of the first event class that occur over time at each node of the multi-node network;

means for identifying one or more groups of nodes that have a correlation with the probability distribution for the reference event of the first event class, wherein the one or more groups of nodes include a portion of a total number of nodes in the multi-node network; and means for generating a reference energy for each of the groups of nodes that correlate with the probability distribution for the reference event of the first event class;

means for generating at least one detection global profile of a first event class, wherein generating at least one detection global profile of a first even class comprises:

means for determining a probability distribution for a detection event of the first event class, wherein the probability distribution is associated with a number of occurrences of the detection event of the first event class that occur over time at each node in the one or more groups of nodes that have the correlation for the reference event of the first event class; and means for generating a detection energy for each of the groups of nodes that correlate with the probability distribution for the reference event of the first event class;

means for comparing the reference energy with the detection energy for each of the groups of nodes having the correlation for the reference event of the first event class; and means for determining if there is a deviation between the reference global profile and the detection global profile.

16. The system of claim 15, wherein the means for generating at least one reference global profile of a first event class comprises means for recording reference events of the first event class on at least a portion of the nodes in the multi-node network.

17. The system of claim 16, further comprising means for computing a hash function for the first event class and means for converting the hash function of the first event class into a node address.

18. The system of claim 15, further comprising means for computing pair-wise correlations from the probability distribution for the reference event of the first event between each node on the multi-node network.

19. The system of claim 15, further comprising means for generating a detection global profile using a sliding window.

20. The system of claim 15, further comprising:

means for generating a plurality of reference global profiles, each reference global profile comprising a different event class;

means for generating a plurality of detection global profiles, each detection global profile corresponding to a reference global profile to produce a corresponding detection global profile; and means for determining if there is at least one deviation from at least one of the plurality of reference global profiles and the corresponding detection global profile.

21. A non-transitory computer readable medium comprising:
computer executable instructions for detecting global anomalies in a multi-node network comprising one or more computing devices, the computer executable instructions configured to:
generate a reference global profile of a first event class, wherein generate the reference global profile of the first class event comprises:
determine a probability distribution for a reference event of the first event class, wherein the probability distribution is associated with a number of occurrences of the reference event of the first event class that occur over time at each node of the multi-node network;
identify one or more groups of nodes that have a correlation with the probability distribution for the reference event of the first event class, wherein the one or more groups of nodes include a portion of a total number of nodes in the multi-node network; and
generate a reference energy for each of the groups of nodes that correlate with the probability distribution for the reference event of the first event class;
generate a detection global profile of a first event class, wherein generate the detection global profile of the first class event comprises:
determine a probability distribution for a detection event of the first event class, wherein the probability distribution is associated with a number of occurrences of the detection event of the first event class that occur over time at each node in the one or more groups of nodes that have the correlation for the reference event of the first event class; and
generate a detection energy for each of the groups of nodes that correlate with the probability distribution for the reference event of the first event class;
compare the reference energy with the detection energy for each of the groups of nodes having the correlation for the reference event of the first event; and
determine if there is a deviation between the reference global profile and the detection global profile.

22. The medium of claim 21, wherein the computer executable instructions are further configured to record reference events of the first event class on each node of the multi-node network.

23. The medium of claim 21, wherein the computer executable instructions are further configured to compute a hash function for the first event class and the hash function converts the first event class into a node address.

24. The medium of claim 21, wherein the computer executable instructions are configured to compute pair-wise correlations from the probability distribution for the reference event of the first event between each node on the multi-node network.

25. The medium of claim 21, wherein the computer executable instructions are further configured to build a detection global profile using a sliding window.

26. The medium of claim 21, wherein the computer executable instructions are further configured to:
generate a plurality of reference global profiles, each reference global profile comprising a different event class;
generate a plurality of detection global profiles, each detection global profile corresponding to a reference global profile to produce corresponding detection global profiles; and
detect at least one deviation from at least one of the plurality of reference global profiles and the corresponding detection global profile.

27. The method of claim 1, wherein the reference event of the first event class is a user login on the multi-node network.

28. The method of claim 1, wherein each of the one or more groups of nodes that have a correlation with the probability distribution for the reference event of the first event class are maximal cliques.

29. The method of claim 1, further comprising flagging an anomaly if there is a deviation between the reference energy with the detection energy for one or more of the groups of nodes having the correlation for the reference event of the first event class.

30. The method of claim 1, wherein identifying one or more groups of nodes that have a correlation with the probability distribution for the reference event of the first event class comprises identifying pairs of nodes having a correlation score above a threshold value.

31. The method of claim 1, wherein determining a probability distribution for a reference event of the first event class comprises recording the reference event on each of the nodes in the multi-node network.

32. The system of claim 10, wherein the reference event of the first event class is a user login on the multi-node network.

33. The system of claim 10, wherein each of the one or more groups of nodes that have a correlation with the probability distribution for the reference event of the first event class are maximal cliques.

34. The system of claim 10, wherein the one or more computing devices is further configured to flag an anomaly if there is a deviation between the reference energy with the detection energy for one or more of the groups of nodes having the correlation for the reference event of the first event class.

35. The system of claim 10, wherein identify one or more groups of nodes that have a correlation with the probability distribution for the reference event of the first event class comprises identify pairs of nodes having a correlation score above a threshold value.

36. The system of claim 10, wherein determining a probability distribution for a reference event of the first event class comprises recording the reference event on each of the nodes in the multi-node network.

37. The system of claim 12, wherein the reference energy (E) is calculated by $$E = \frac{\mu}{1+\sigma^2}$$

wherein $\mu$ is a mean of the absolute value of the pair-wise correlation scores between each node in a group of nodes that have a correlation and $\sigma^2$ is the variance.

38. The system of claim 12, wherein the pair-wise correlation scores comprise Pearson coefficients.

39. The system of claim 10, wherein generating the probability distribution for the reference event of the first event class comprises:
select an epoch;
divide the epoch into time segments; and record the reference event of the first event class occurring on each node in the multi-node network during the epoch.

40. The system of claim 39, wherein the probability distribution for the reference event of the first event class is generated using a plurality of epochs.

41. The system of claim 15, wherein the reference event of the first event class is a user login on the multi-node network.

42. The system of claim 15, wherein each of the one or more groups of nodes that have a correlation with the probability distribution for the reference event of the first event class are maximal cliques.

43. The system of claim 15, further comprising means for flagging an anomaly if there is a deviation between the reference energy with the detection energy for one or more of the groups of nodes having the correlation for the reference event of the first event class.

44. The system of claim 15, wherein identifying one or more groups of nodes that have a correlation with the probability distribution for the reference event of the first event class comprises means for identifying pairs of nodes having a correlation score above a threshold value.

45. The system of claim 15, wherein means for determining a probability distribution for a reference event of the first event class comprises means for recording the reference event on each of the nodes in the multi-node network.

46. The system of claim 18, wherein the reference energy (E) is calculated by $$E = \frac{\mu}{1+\sigma^2}$$

wherein $\mu$ is a mean of the absolute value of the pair-wise correlation scores between each node in a group of nodes that have a correlation and $\sigma^2$ is the variance.

47. The system of claim 18, wherein the pair-wise correlation scores comprise Pearson coefficients.

48. The system of claim 15, wherein the means for generating the probability distribution for the reference event of the first event class comprises:
means for selecting an epoch;
means for dividing the epoch into time segments; and
means for recording the reference event of the first event class occurring on each node in the multi-node network during the epoch.

49. The system of claim 48, wherein the probability distribution for the reference event of the first event class is generated using a plurality of epochs.

50. The computer-readable medium of claim 21, wherein the reference event of the first event class is a user login on the multi-node network.

51. The computer-readable medium of claim 21, wherein each of the one or more groups of nodes that have a correlation with the probability distribution for the reference event of the first event class are maximal cliques.

52. The computer-readable medium of claim 21, wherein the computer executable instructions are further configured to flag an anomaly if there is a deviation between the reference energy with the detection energy for one or more of the groups of nodes having the correlation for the reference event of the first event class.

53. The computer-readable medium of claim 21, wherein identify one or more groups of nodes that have a correlation with the probability distribution for the reference event of the first event class comprises identify pairs of nodes having a correlation score above a threshold value.

54. The computer-readable medium of claim 21, wherein determining a probability distribution for a reference event of the first event class comprises recording the reference event on each of the nodes in the multi-node network.

55. The computer-readable medium of claim 24, wherein the reference energy (E) is calculated by $$E = \frac{\mu}{1+\sigma^2}$$

wherein $\mu$ is a mean of the absolute value of the pair-wise correlation scores between each node in a group of nodes that have a correlation and $\sigma^2$ is the variance.

56. The computer-readable medium of claim 24, wherein the pair-wise correlation scores comprise Pearson coefficients.

57. The computer-readable medium of claim 24, wherein generating the probability distribution for the reference event of the first event class comprises:
select an epoch;
divide the epoch into time segments; and
record the reference event of the first event class occurring on each node in the multi-node network during the epoch.

* * * * *

UNITED STATES PATENT AND TRADEMARK OFFICE
CERTIFICATE OF CORRECTION

| | | |
|---|---|---|
| PATENT NO. | : 8,296,850 B2 | Page 1 of 10 |
| APPLICATION NO. | : 12/195786 | |
| DATED | : October 23, 2012 | |
| INVENTOR(S) | : Srinivasa et al. | |

It is certified that error appears in the above-identified patent and that said Letters Patent is hereby corrected as shown below:

In the Drawings, delete Figures 1-9 and replace with attached Figures 1-9.

In the Specification:

In Column 2, Line 3, delete "is" and insert -- is a --, therefor.

In Column 3, Line 5, delete "(DDOS attack)." and insert -- (DDoS attack). --, therefor.

In Column 4, Line 35, delete "anther" and insert -- another --, therefor.

In the Claims:

In Column 15, Line 56, in Claim 12, delete "of 10," and insert -- of claim 10, --, therefor.

In Column 15, Line 61, in Claim 13, delete "of 10" and insert -- of claim 10 --, therefor.

In Column 15, Line 64, in Claim 14, delete "of 10," and insert -- of claim 10, --, therefor.

Signed and Sealed this
Ninth Day of April, 2013

Teresa Stanek Rea
*Acting Director of the United States Patent and Trademark Office*

|  | $t_1$ | $t_2$ | $t_3$ | ... | $t_m$ |
|---|---|---|---|---|---|
| $e_1$ | $P_{11}$ | $P_{12}$ |  |  |  |
| $e_2$ | $P_{21}$ |  |  |  |  |
| $e_3$ |  |  |  |  |  |
|  |  |  |  |  |  |
|  |  |  |  |  |  |
| $e_N$ |  |  |  |  |  |

*FIG. 1*

|  | $t_1$ | $t_2$ | $t_3$ | .... | $t_{24}$ |
|---|---|---|---|---|---|
| $U_1$ | $p_{11}$ | $p_{12}$ | ... |  |  |
| $U_2$ |  |  |  |  |  |
| $U_3$ |  |  |  |  |  |
| .... |  |  |  |  |  |
| $U_N$ |  |  |  |  |  |

*FIG. 6*

UNITED STATES PATENT AND TRADEMARK OFFICE
CERTIFICATE OF CORRECTION

PATENT NO. : 8,296,850 B2
APPLICATION NO. : 12/195786
DATED : October 23, 2012
INVENTOR(S) : Srinivasa et al.

It is certified that error appears in the above-identified patent and that said Letters Patent is hereby corrected as shown below:

Delete the title page and substitute therefore the attached title page consisting of corrected illustrative Fig. 9.

Delete Drawing Sheets 1-9 and substitute therefore with the attached Drawing Sheets 1-9. Figs. 1-11 have been replaced with new Figs. 1-11.

In the Specification:

In Column 2, Line 3, delete "is" and insert -- is a --, therefore.

In Column 3, Line 5, delete "(DDOS attack)." and insert -- (DDoS attack). --, therefore.

In Column 4, Line 35, delete "anther" and insert -- another --, therefore.

In the Claims:

In Column 15, Line 56, in Claim 12, delete "of 10," and insert -- of claim 10, --, therefore.

In Column 15, Line 61, in Claim 13, delete "of 10" and insert -- of claim 10 --, therefore.

In Column 15, Line 64, in Claim 14, delete "of 10," and insert -- of claim 10, --, therefore.

This certificate supersedes the Certificate of Correction issued April 9, 2013.

Signed and Sealed this
Twenty-eighth Day of May, 2013

Teresa Stanek Rea
*Acting Director of the United States Patent and Trademark Office*

(12) United States Patent
Srinivasa et al.

(10) Patent No.: US 8,296,850 B2
(45) Date of Patent: Oct. 23, 2012

(54) DETECTING GLOBAL ANOMALIES

(75) Inventors: Srinath Srinivasa, Bangalore (IN); Pramod Sakharam Pawar, Bangalore (IN)

(73) Assignee: Empire Technology Development LLC, Wilmington, DE (US)

( * ) Notice: Subject to any disclaimer, the term of this patent is extended or adjusted under 35 U.S.C. 154(b) by 872 days.

(21) Appl. No.: 12/195,786

(22) Filed: Aug. 21, 2008

(65) Prior Publication Data

US 2009/0300769 A1    Dec. 3, 2009

(30) Foreign Application Priority Data

May 28, 2008    (IN) .................. 1304/DEL/2008

(51) Int. Cl.
*H04L 9/32* (2006.01)
(52) U.S. Cl. .......... 726/26; 726/2; 726/22; 726/23; 726/24; 726/25; 709/223; 709/224; 709/225
(58) Field of Classification Search .......... 726/2, 22–26; 709/223–225
See application file for complete search history.

(56) References Cited

U.S. PATENT DOCUMENTS

| | | | |
|---|---|---|---|
| 7,594,260 B2 * | 9/2009 | Porras et al. | 726/13 |
| 2005/0222929 A1 * | 10/2005 | Steier et al. | 705/35 |
| 2007/0150954 A1 * | 6/2007 | Shon | 726/23 |
| 2008/0250497 A1 * | 10/2008 | Mullarkey et al. | 726/22 |
| 2008/0288427 A1 * | 11/2008 | Barson et al. | 706/25 |
| 2009/0161544 A1 * | 6/2009 | Kelly et al. | 370/232 |
| 2009/0172818 A1 * | 7/2009 | Sutherland et al. | 726/25 |
| 2010/0118881 A1 * | 5/2010 | Palmer et al. | 370/401 |

OTHER PUBLICATIONS

Dash et al., When Gossip Is Good: Distributed Probabilistic Inference for Detection of Slow Network Intrusions, In Proceedings of the 21st National Conference on Artificial Intelligence. 2006, pp. 1115-1122.

Li et al., Dependency-based Distributed Intrusion Detection, In Proceedings of the DETER Community Workshop on Cyber Security Experimentation and Test 2007, pp. 1-8.

Huang et al., Distributed PCA and Network Anomaly Detection, Technical Report No. UCB/EECS-2006-99, Electrical Engineering and Computer Science Department, University of California Berkeley, Jul. 14, 2006, pp. 1-15.

Choon, O. and Samsudin, A., "Grid-based intrusion detection system" in Proc 9th Asia-Pacific Conference on Communications, vol. 3, pp. 1028-1032, Sep. 21-24, 2003.

Denning, D. E., "An intrusion-detection model." IEEE Transactions on Software Engineering, vol. SE-13(No. 2):222-232, Feb. 1987.

K. Kendall, "A Database of Computer Attacks for the Evaluation of Intrusion Detection Systems", Master Thesis, Department of Electrical Engineering and Computer Science, Massachusetts Institute of Technology (MIT), Cambridge, MA, USA, Jun. 1999.

Kenny, S. and Coghlan, B., "Towards a grid-wide intrusion detection system", in Proc. European Grid Conference (EGC2005), pp. 275-284, Amsterdam, The Netherlands, Feb. 2005.

(Continued)

*Primary Examiner* — Aravind Moorthy
*Assistant Examiner* — Joseph Pan
(74) *Attorney, Agent, or Firm* — Knobbe, Martens, Olson & Bear, LLP

(57) ABSTRACT

Systems and methods of detecting distributed attacks that pose a threat affecting more than one node in the network. The distributed attacks include events that appear normal or innocuous when viewed locally at any node. The systems and methods include reference global profiles and detection global profiles corresponding to activities or events of interest on the network.

57 Claims, 9 Drawing Sheets

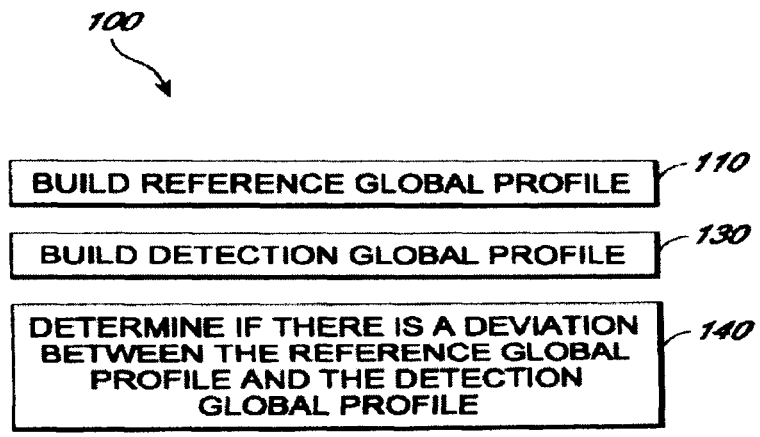

|  | $t_1$ | $t_2$ | $t_3$ | ... ... | $t_m$ |
|---|---|---|---|---|---|
| $\theta_1$ | $P_{11}$ | $P_{12}$ |  |  |  |
| $\theta_2$ | $P_{21}$ |  |  |  |  |
| $\theta_3$ |  |  |  |  |  |
|  |  |  |  |  |  |
|  |  |  |  |  |  |
| $\theta_N$ |  |  |  |  |  |

*FIG. 1*

|  | $t_1$ | $t_2$ | $t_3$ | .... | $t_{24}$ |
|---|---|---|---|---|---|
| $U_1$ | $p_{11}$ | $p_{12}$ | ... | | |
| $U_2$ | | | | | |
| $U_3$ | | | | | |
| .... | | | | | |
| $U_N$ | | | | | |

*FIG. 6*